US012697999B2

(12) United States Patent
Yildiz et al.

(10) Patent No.: US 12,697,999 B2
(45) Date of Patent: Aug. 4, 2026

(54) BACKWARD MONTE CARLO TREE SEARCH MODEL FOR MONITORING AND ANALYZING SAFETY OF BELIEF REASONING FOR AUTONOMOUS VEHICLES

(71) Applicants: Nissan North America, Inc., Franklin, TN (US); The Board of Trustees of the Leland Stanford Junior University, Stanford, CA (US)

(72) Inventors: Anil Yildiz, Stanford, CA (US); Esen Yel, Cohoes, NY (US); Marcell Jose Vazquez-Chanlatte, Palo Alto, CA (US); Kyle Hollins Wray, Boston, MA (US); Mykel Kochenderfer, Palo Alto, CA (US); Stefan Witwicki, San Carlos, CA (US)

(73) Assignees: Nissan North America, Inc., Franklin, TN (US); The Board of Trustees of the Leland Stanford Junior University, Stanford, CA (US)

( * ) Notice: Subject to any disclaimer, the term of this patent is extended or adjusted under 35 U.S.C. 154(b) by 57 days.

(21) Appl. No.: 18/789,090

(22) Filed: Jul. 30, 2024

(65) Prior Publication Data

US 2026/0035007 A1 Feb. 5, 2026

(51) Int. Cl.
*B60W 60/00* (2020.01)
*B60W 50/00* (2006.01)
*G06N 7/01* (2023.01)

(52) U.S. Cl.
CPC ...... *B60W 60/001* (2020.02); *B60W 50/0097* (2013.01); *G06N 7/01* (2023.01); *B60W 2554/404* (2020.02); *B60W 2556/45* (2020.02)

(58) Field of Classification Search
None
See application file for complete search history.

(56) References Cited

U.S. PATENT DOCUMENTS

2018/0141544 A1* 5/2018 Xiao .................. G01C 21/3469

OTHER PUBLICATIONS

Ahn et al., "Reachability-based Decision Making for City Driving", Mitsubishi Electric Research Laboratories, https://shadow.merl.com/publications/docs/TR2018-091.pdf (Year: 2018).*

* cited by examiner

*Primary Examiner* — Aaron L Troost
(74) *Attorney, Agent, or Firm* — Young Basile Hanlon & MacFarlane P.C.

(57) ABSTRACT

A vehicle traversing a vehicle transportation network may use a scenario-specific operational control evaluation model instance. The vehicle may receive operational environment data that includes data associated with an object external to the vehicle. The vehicle may determine, based at least in part on the data associated with the object, a final belief associated with an undesired outcome. The vehicle may construct a backward Monte Carlo tree search model based on the final belief and may determine, based on the backward Monte Carlo tree search model, a set of initial beliefs corresponding to a likelihood of leading to the final belief within a timestep threshold. A policy may be trained using the set of initial beliefs. Based on the trained policy, a set of candidate vehicle control actions may be determined, and a vehicle control action may be selected from the set of candidate vehicle control actions.

20 Claims, 12 Drawing Sheets

500

OPERATE A SCENARIO-SPECIFIC
OPERATIONAL CONTROL
EVALUATION MODEL INSTANCE — 510

GENERATE TRAINED
POLICY — 520

RECEIVE CANDIDATE
VEHICLE CONTROL
ACTIONS — 530

SELECT A VEHICLE
CONTROL ACTION — 540

TRAVERSE A PORTION OF THE
VEHICLE TRANSPORTATION
NETWORK — 550

BACKWARD MONTE CARLO TREE SEARCH MODEL FOR MONITORING AND ANALYZING SAFETY OF BELIEF REASONING FOR AUTONOMOUS VEHICLES

TECHNICAL FIELD

This disclosure relates to autonomous vehicle operational management and autonomous driving.

BACKGROUND

Autonomous vehicles may traverse a vehicle transportation network, which may include encountering distinct vehicle operational scenarios. The autonomous vehicles may traverse a current distinct vehicle operational scenario using a policy or solution for a model of the current distinct vehicle operational scenario. An autonomous vehicle may have limited resources for identifying distinct vehicle operational scenarios and generating or optimizing corresponding policies. Typical systems use single objective reasoning in decision making and do not consider riskiness/safety, social acceptability, or passenger preferences. The decision-making capability for typical systems is therefore limited.

SUMMARY

Disclosed herein are aspects, features, elements, implementations, and embodiments of scenario-specific operational control management with multiple objectives and an explanation and control interface design that may be used to explain, modify, control, and adapt decision making for passengers, developers, and remote assistance support of autonomous vehicles.

An aspect of the disclosed embodiments is a method for use with a vehicle in traversing a vehicle transportation network. The method includes receiving, while the vehicle is traversing the vehicle transportation network, operational environment data, wherein the operational environment data includes data associated with an object external to the vehicle; determining, based at least in part on the data associated with the object, a final belief associated with an undesired outcome; constructing a backward Monte Carlo tree search model based on the final belief; determining, based on the backward Monte Carlo tree search model, a set of initial beliefs corresponding to a likelihood of leading to the final belief within a timestep threshold; generating a trained policy by training, using the set of initial beliefs, a policy that maps a respective belief for the object within the distinct vehicle operation scenario to a respective candidate vehicle control action; determining, based on the trained policy, a set of candidate vehicle control actions; and selecting, for traversing the vehicle transportation network, a vehicle control action from the set of candidate vehicle control actions.

Another aspect of the disclosed embodiments is an apparatus for use with a vehicle traversing a vehicle transportation network. The apparatus includes a processor. The processor is configured to receive, while the vehicle is traversing the vehicle transportation network, operational environment data, wherein the operational environment data includes data associated with an object external to the vehicle; determine, based at least in part on the data associated with the object, a final belief associated with an undesired outcome; determine, based on a backward Monte Carlo tree search model constructed based on the final belief, a set of initial beliefs corresponding to a likelihood of leading to the final belief within a timestep threshold; generate a trained policy by training, using the set of initial beliefs, a policy that maps a respective belief for the object within the distinct vehicle operation scenario to a respective candidate vehicle control action; determine, based on the trained policy, a set of candidate vehicle control actions; and select, for traversing the vehicle transportation network, a vehicle control action from the set of candidate vehicle control actions.

Another aspect of the disclosed embodiments is an autonomous vehicle that includes a processor. The processor is configured to execute instructions stored on a non-transitory computer readable medium to receive, while the vehicle is traversing the vehicle transportation network, operational environment data, wherein the operational environment data includes data associated with an object external to the vehicle; determine, based at least in part on the data associated with the object, a final belief associated with an undesired outcome; determine, based on a backward Monte Carlo tree search model constructed based on the final belief, a set of initial beliefs corresponding to a likelihood of leading to the final belief within a timestep threshold; determine, based on a trained policy, a set of candidate vehicle control actions, wherein the trained policy comprises a policy, trained using the set of initial beliefs, that maps a respective belief for the object within the distinct vehicle operation scenario to a respective candidate vehicle control action; and select, for traversing the vehicle transportation network, a vehicle control action from the set of candidate vehicle control actions.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings.

DETAILED DESCRIPTION

Figure 1:
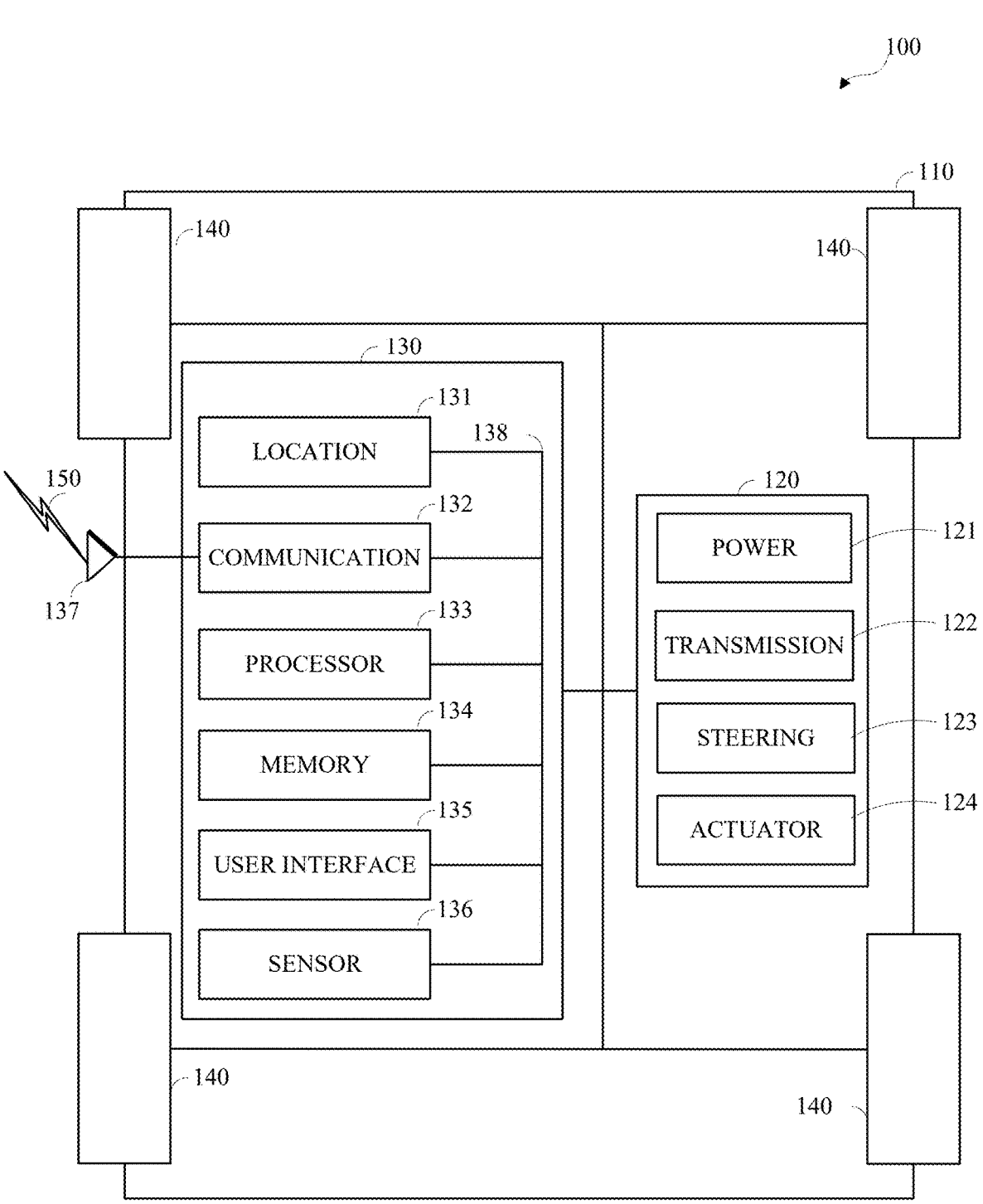
FIG. 1 is a diagram of an example of a vehicle in which the aspects, features, and elements disclosed herein may be implemented.

Vehicles, such as autonomous vehicles, or semi-autonomous vehicles, may traverse a vehicle transportation network. A semi-autonomous vehicle may be one that includes an advanced driver assist system (ADAS). An ADAS can automate, adapt, and/or enhance vehicle systems for safety and better driving such as to circumvent and/or correct driver errors. Collectively, autonomous and semi-autonomous vehicles may be referred to as autonomous vehicles (AV) or simply vehicles herein. Traversing the vehicle transportation network may include traversing one or more distinct vehicle operational scenarios, such as pedestrian scenarios, intersection scenarios, lane change scenarios, or any other vehicle operational scenario or combination of vehicle operational scenarios.

An autonomous vehicle may traverse a current distinct vehicle operational scenario based on a policy or solution for a model, such as a Partially Observable Markov Decision Process (POMDP) model, of a respective distinct vehicle operational scenario. In some embodiments, the autonomous vehicle may electronically communicate with an external (e.g., centralized) scenario-specific operational control management device to identify distinct vehicle operational scenarios and to identify corresponding policy data for respective models of the distinct vehicle operational scenarios. The policy may be a multi-objective policy. Operations of the vehicle may be at least partially controlled by an agent. An agent is an entity including hardware and/or software configured to determine operations to be made and to cause the vehicle (sometimes referred to as an "ego vehicle") to perform the operations. The agent may be implemented on the vehicle, in the external scenario-specific operational control management device, and/or a combination thereof.

In partially observable settings, the agent infers the state of the environment indirectly through observations. Based on these observations, the agent maintains a belief over the state of the world, which is used to generate actions through a policy to achieve its goal. Such a sequential decision-making problem can be systematically framed as a POMDP. For the safety validation of such systems, it is useful to quantify the set of beliefs where the agent's policy has a non-negligible probability of transitioning to an unsafe state within a certain number of timesteps. Determining this set of beliefs can be used to retrain the policy specifically for those beliefs. Furthermore, such a component in a real-time safety-critical system could warn a user to briefly override the policy and engage in manual control if found in such a belief. The lack of full observability makes it difficult to perform such a safety analysis. Techniques used for policy validation in Markov decision process (MDP) settings may not be directly applied to POMDPs for the following three reasons: (1) the lack of complete observability introduces significant computational complexity in decision-making, (2) the belief space in POMDPs can be continuous and very large, making it computationally challenging to scale to high-dimension state spaces, and (3) value functions and policies for POMDPs need to be functions of beliefs rather than the actual states, leading to increased complexity in value function approximations and policy optimizations.

Monte Carlo tree search methods are often used in partially observable settings due to their scalability and efficiency in branching. A typical Monte Carlo tree search starts from a single root node, and branches forward in time, top to bottom, into multiple leaf nodes to simulate transitions of the system across multiple timesteps. Actions and observations are selected/sampled at each layer with respect to a policy/distribution. As the tree branches forward in time, the agent reaches certain nodes for a desired depth. One drawback of a forward search is the unlikeliness of reaching a low probability phenomenon of interest, such as a collision.

To mitigate this drawback, aspects of implementations described herein provide an approach that specifically focuses on detecting beliefs that have a non-negligible probability of arriving at an undesired final state or belief of interest at any instance, given the underlying policy of the agent. To detect such beliefs, an agent may construct a tree backward in time, branching from a single leaf node to multiple root nodes, for a specified number of timesteps. The tree is constructed beginning with a leaf node and progressing to the root nodes, which is the reverse of the usual forward search. In the backward tree, the agent may constrain its focus to a single final state or belief, and branch backward in time for a desired depth. This approach may ensure that the preceding branches of the tree are systematically conditioned to lead to the regarded final leaf node. The constructed tree yields a set of likely beliefs that reach the regarded undesired final belief within the specified number of timesteps. Additional details are discussed below after a description of an environment in which aspects of the teachings herein may be implemented.

FIG. 1 is a diagram of an example of a vehicle in which the aspects, features, and elements disclosed herein may be implemented. As shown, a vehicle 100 includes a chassis 110, a powertrain 120, a controller 130, and wheels 140. Although the vehicle 100 is shown as including four wheels 140 for simplicity, any other propulsion device or devices, such as a propeller or tread, may be used. In FIG. 1, the lines interconnecting elements, such as the powertrain 120, the controller 130, and the wheels 140, indicate that information, such as data or control signals, power, such as electrical power or torque, or both information and power, may be communicated between the respective elements. For example, the controller 130 may receive power from the powertrain 120 and may communicate with the powertrain 120, the wheels 140, or both, to control the vehicle 100, which may include accelerating, decelerating, steering, or otherwise controlling the vehicle 100.

As shown, the powertrain 120 includes a power source 121, a transmission 122, a steering unit 123, and an actuator 124. Other elements or combinations of elements of a powertrain, such as a suspension, a drive shaft, axles, or an exhaust system may be included. Although shown separately, the wheels 140 may be included in the powertrain 120.

The power source 121 may include an engine, a battery, or a combination thereof. The power source 121 may be any device or combination of devices operative to provide energy, such as electrical energy, thermal energy, or kinetic energy. For example, the power source 121 may include an engine, such as an internal combustion engine, an electric motor, or a combination of an internal combustion engine and an electric motor, and may be operative to provide kinetic energy as a motive force to one or more of the wheels 140. The power source 121 may include a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 122 may receive energy, such as kinetic energy, from the power source 121, and may transmit the energy to the wheels 140 to provide a motive force. The transmission 122 may be controlled by the controller 130 the actuator 124 or both. The steering unit 123 may be controlled by the controller 130 the actuator 124 or both and may control the wheels 140 to steer the vehicle. The actuator 124 may receive signals from the controller 130 and may actuate or control the power source 121, the transmission 122, the steering unit 123, or any combination thereof to operate the vehicle 100.

As shown, the controller 130 may include a location unit 131, an electronic communication unit 132, a processor 133, a memory 134, a user interface 135, a sensor 136, an electronic communication interface 137, or any combination thereof. Although shown as a single unit, any one or more elements of the controller 130 may be integrated into any number of separate physical units. For example, the user interface 135 and the processor 133 may be integrated in a first physical unit and the memory 134 may be integrated in a second physical unit. Although not shown in FIG. 1, the controller 130 may include a power source, such as a battery. Although shown as separate elements, the location unit 131, the electronic communication unit 132, the processor 133, the memory 134, the user interface 135, the sensor 136, the electronic communication interface 137, or any combination thereof may be integrated in one or more electronic units, circuits, or chips.

The processor 133 may include any device or combination of devices capable of manipulating or processing a signal or other information now-existing or hereafter developed, including optical processors, quantum processors, molecular processors, or a combination thereof. For example, the processor 133 may include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. The processor 133 may be operatively coupled with the location unit 131, the memory 134, the electronic communication interface 137, the electronic communication unit 132, the user interface 135, the sensor 136, the powertrain 120, or any combination thereof. For example, the processor may be operatively coupled with the memory 134 via a communication bus 138.

The memory 134 may include any tangible non-transitory computer-usable or computer-readable medium, capable of, for example, containing, storing, communicating, or transporting machine readable instructions, or any information associated therewith, for use by or in connection with the processor 133. The memory 134 may be, for example, one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof.

The communication interface 137 may be a wireless antenna, as shown, a wired communication port, an optical communication port, or any other wired or wireless unit capable of interfacing with a wired or wireless electronic communication medium 150. Although FIG. 1 shows the communication interface 137 communicating via a single communication link, a communication interface may be configured to communicate via multiple communication links. Although FIG. 1 shows a single communication interface 137, a vehicle may include any number of communication interfaces.

The communication unit 132 may be configured to transmit or receive signals via a wired or wireless electronic communication medium 150, such as via the communication interface 137. Although not explicitly shown in FIG. 1, the communication unit 132 may be configured to transmit, receive, or both via any wired or wireless communication medium, such as radio frequency (RF), ultraviolet (UV), visible light, fiber optic, wireline, or a combination thereof. Although FIG. 1 shows a single communication unit 132 and a single communication interface 137, any number of communication units and any number of communication interfaces may be used. In some embodiments, the communication unit 132 may include a dedicated short-range communications (DSRC) unit, an on-board unit (OBU), or a combination thereof.

The location unit 131 may determine geolocation information, such as longitude, latitude, elevation, direction of travel, or speed, of the vehicle 100. For example, the location unit may include a global positioning system (GPS) unit, such as a Wide Area Augmentation System (WAAS) enabled National Marine-Electronics Association (NMEA) unit, a radio triangulation unit, or a combination thereof. The location unit 131 can be used to obtain information that represents, for example, a current heading of the vehicle 100, a current position of the vehicle 100 in two or three dimensions, a current angular orientation of the vehicle 100, or a combination thereof.

The user interface 135 may include any unit capable of interfacing with a person, such as a virtual or physical keypad, a touchpad, a display, a touch display, a heads-up display, a virtual display, an augmented reality display, a haptic display, a feature tracking device, such as an eye-tracking device, a speaker, a microphone, a video camera, a sensor, a printer, or any combination thereof. The user interface 135 may be operatively coupled with the processor 133, as shown, or with any other element of the controller 130. Although shown as a single unit, the user interface 135 may include one or more physical units. For example, the user interface 135 may include an audio interface for performing audio communication with a person and a touch display for performing visual and touch-based communication with the person. The user interface 135 may include multiple displays, such as multiple physically separate units, multiple defined portions within a single physical unit, or a combination thereof.

The sensor 136 may include one or more sensors, such as an array of sensors, which may be operable to provide information that may be used to control the vehicle. The sensors 136 may provide information regarding current operating characteristics of the vehicle 100. The sensor 136 can include, for example, a speed sensor, acceleration sensors, a steering angle sensor, traction-related sensors, braking-related sensors, steering wheel position sensors, eye tracking sensors, seating position sensors, or any sensor, or combination of sensors, operable to report information regarding some aspect of the current dynamic situation of the vehicle 100.

The sensor 136 may include one or more sensors operable to obtain information regarding the physical environment surrounding the vehicle 100. For example, one or more sensors may detect road geometry and features, such as lane lines, and obstacles, such as fixed obstacles, vehicles, and pedestrians. The sensor 136 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 136 and the location unit 131 may be a combined unit.

Although not shown separately, the vehicle 100 may include a trajectory controller. For example, the controller 130 may include the trajectory controller. The trajectory controller may be operable to obtain information describing a current state of the vehicle 100 and a route planned for the vehicle 100, and, based on this information, to determine and optimize a trajectory for the vehicle 100. In some embodiments, the trajectory controller may output signals operable to control the vehicle 100 such that the vehicle 100 follows the trajectory that is determined by the trajectory controller. For example, the output of the trajectory controller can be an optimized trajectory that may be supplied to the powertrain 120, the wheels 140, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 140 may be a steered wheel, which may be pivoted to a steering angle under control of the steering unit 123, a propelled wheel, which may be torqued to propel the vehicle 100 under control of the transmission 122, or a steered and propelled wheel that may steer and propel the vehicle 100.

A vehicle may include units, or elements, not expressly shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

The vehicle 100 may be an autonomous vehicle controlled autonomously, without direct human intervention, to traverse a portion of a vehicle transportation network. Although not shown separately in FIG. 1, an autonomous vehicle may include an autonomous vehicle control unit, which may perform autonomous vehicle routing, navigation, and control. The autonomous vehicle control unit may be integrated with another unit of the vehicle. For example, the controller 130 may include the autonomous vehicle control unit. The teachings herein are equally applicable to a semi-autonomous vehicle.

The autonomous vehicle control unit may control or operate the vehicle 100 to traverse a portion of the vehicle transportation network in accordance with current vehicle operation parameters. The autonomous vehicle control unit may control or operate the vehicle 100 to perform a defined operation or maneuver, such as parking the vehicle. The autonomous vehicle control unit may generate a route of travel from an origin, such as a current location of the vehicle 100, to a destination based on vehicle information, environment information, vehicle transportation network data representing the vehicle transportation network, or a combination thereof, and may control or operate the vehicle 100 to traverse the vehicle transportation network in accordance with the route. For example, the autonomous vehicle control unit may output the route of travel to the trajectory controller, and the trajectory controller may operate the vehicle 100 to travel from the origin to the destination using the generated route.

Figure 2:
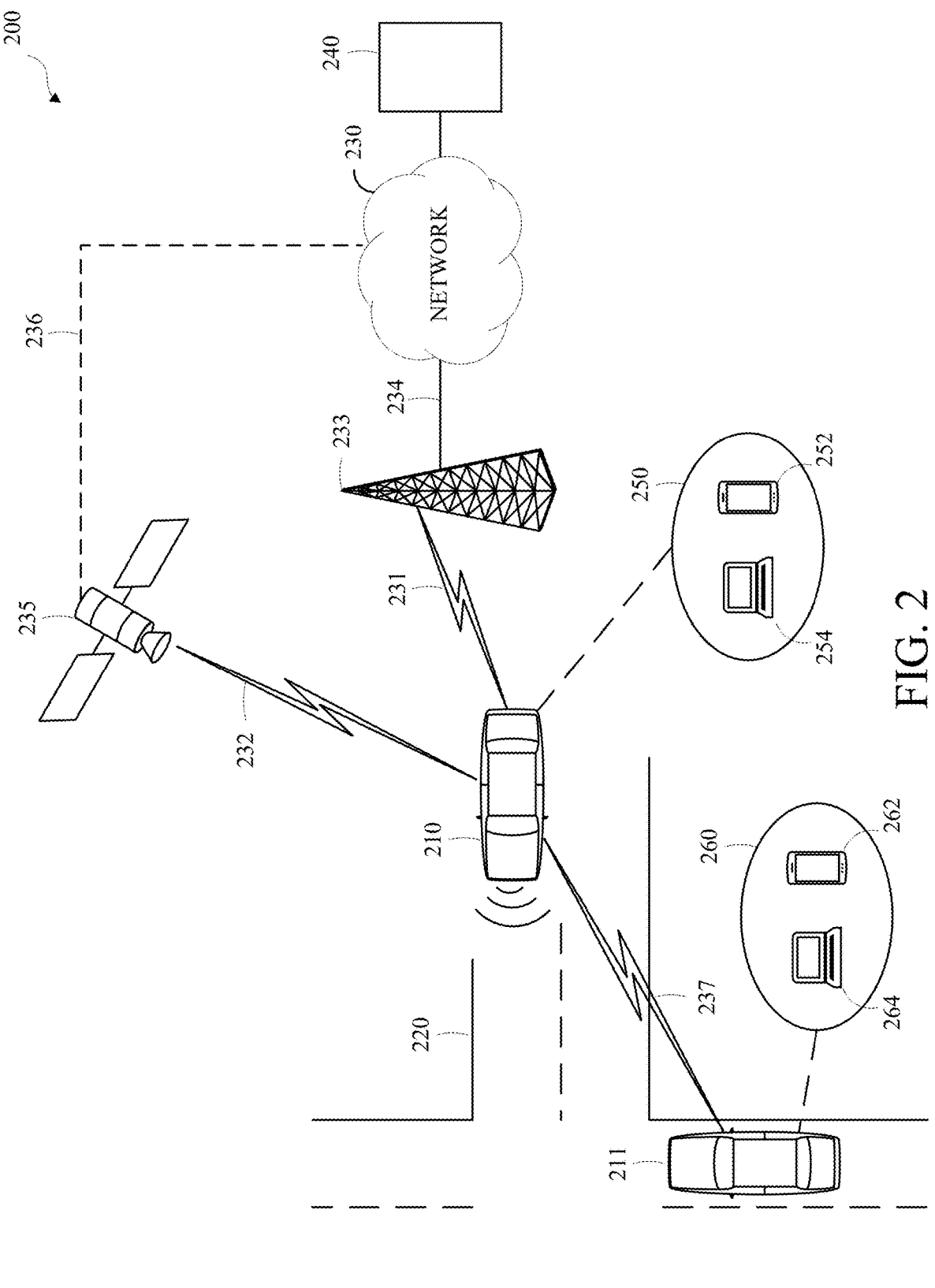
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system in which the aspects, features, and elements disclosed herein may be implemented. The vehicle transportation and communication system 200 may include one or more vehicles 210/211, such as the vehicle 100 shown in FIG. 1, which may travel via one or more portions of one or more vehicle transportation networks 220, and may communicate via one or more electronic communication networks 230. Although not explicitly shown in FIG. 2, a vehicle may traverse an area that is not expressly or completely included in a vehicle transportation network, such as an off-road area.

The electronic communication network 230 may be, for example, a multiple access system and may provide for communication, such as voice communication, data communication, video communication, messaging communication, or a combination thereof, between the vehicle 210/211 and one or more communication devices 240. For example, a vehicle 210/211 may receive information, such as information representing the vehicle transportation network 220, from a communication device 240 via the network 230.

In some embodiments, a vehicle 210/211 may communicate via a wired communication link (not shown), a wireless communication link 231/232/237, or a combination of any number of wired or wireless communication links. For example, as shown, a vehicle 210/211 may communicate via a terrestrial wireless communication link 231, via a non-terrestrial wireless communication link 232, or via a combination thereof. The terrestrial wireless communication link 231 may include an Ethernet link, a serial link, a Bluetooth link, an infrared (IR) link, a UV link, or any link capable of providing for electronic communication.

A vehicle 210/211 may communicate with another vehicle 210/2110. For example, a host, or subject, vehicle (HV) 210 may receive one or more automated inter-vehicle messages, such as a basic safety message (BSM), from a remote, or target, vehicle (RV) 211, via a direct communication link 237, or via a network 230. For example, the remote vehicle 211 may broadcast the message to host vehicles within a defined broadcast range, such as 300 meters. In some embodiments, the host vehicle 210 may receive a message via a third party, such as a signal repeater (not shown) or another remote vehicle (not shown). A vehicle 210/211 may transmit one or more automated inter-vehicle messages periodically, based on, for example, a defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmission of the transmitting vehicle is in a neutral state, a parked state, a forward state, or a reverse state.

The vehicle 210 may communicate with the communications network 230 via an access point 233. The access point 233, which may include a computing device, may be configured to communicate with a vehicle 210, with a communication network 230, with one or more communication devices 240, or with a combination thereof via wired or wireless communication links 231/234. For example, the access point 233 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit in FIG. 2, an access point may include any number of interconnected elements.

The vehicle 210 may communicate with the communications network 230 via a satellite 235 or other non-terrestrial communication device. The satellite 235, which may include a computing device, may be configured to communicate with a vehicle 210, with a communication network 230, with one or more communication devices 240, or with a combination thereof via one or more communication links 232/236. Although shown as a single unit in FIG. 2, a satellite may include any number of interconnected elements.

An electronic communication network 230 may be any type of network configured to provide for voice, data, or any other type of electronic communication. For example, the electronic communication network 230 may include a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the HyperText Transport Protocol (HTTP), or a combination thereof. Although shown as a single unit in FIG. 2, an electronic communication network may include any number of interconnected elements.

The vehicle 210 may identify a portion or condition of the vehicle transportation network 220. For example, the vehicle 210 may include one or more on-vehicle sensors, such as sensor 136 shown in FIG. 1, which may include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 220. The sensor data may include lane line data, remote vehicle location data, or both.

The vehicle 210 may traverse a portion or portions of one or more vehicle transportation networks 220 using information communicated via the network 230, such as information representing the vehicle transportation network 220, information identified by one or more on-vehicle sensors, or a combination thereof.

Although for simplicity FIG. 2 shows two vehicles 210, 211, one vehicle transportation network 220, one electronic communication network 230, and one communication device 240, any number of vehicles, networks, or computing devices may be used. The vehicle transportation and communication system 200 may include devices, units, or elements not shown in FIG. 2. Although the vehicle 210 is shown as a single unit, a vehicle may include any number of interconnected elements.

Although the vehicle 210 is shown communicating with the communication device 240 via the network 230, the vehicle 210 may communicate with the communication device 240 via any number of direct or indirect communication links. For example, the vehicle 210 may communicate with the communication device 240 via a direct communication link, such as a Bluetooth communication link.

In some embodiments, a vehicle 210/211 may be associated with an entity 250/260, such as a driver, operator, or owner of the vehicle. In some embodiments, an entity 250/260 associated with a vehicle 210/211 may be associated with one or more personal electronic devices 252/254/262/264, such as a smartphone 252/262 or a computer 254/264. In some embodiments, a personal electronic device 252/254/262/264 may communicate with a corresponding vehicle 210/211 via a direct or indirect communication link. Although one entity 250/260 is shown as associated with a respective vehicle 210/211 in FIG. 2, any number of vehicles may be associated with an entity and any number of entities may be associated with a vehicle.

The vehicle transportation network 220 shows only navigable areas (e.g., roads), but the vehicle transportation network may also include one or more unnavigable areas, such as a building, one or more partially navigable areas, such as a parking area or pedestrian walkway, or a combination thereof. The vehicle transportation network 220 may also include one or more interchanges between one or more navigable, or partially navigable, areas. A portion of the vehicle transportation network 220, such as a road, may include one or more lanes and may be associated with one or more directions of travel.

A vehicle transportation network, or a portion thereof, may be represented as vehicle transportation network data. For example, vehicle transportation network data may be expressed as a hierarchy of elements, such as markup language elements, which may be stored in a database or file. For simplicity, the figures herein depict vehicle transportation network data representing portions of a vehicle transportation network as diagrams or maps; however, vehicle transportation network data may be expressed in any computer-usable form capable of representing a vehicle transportation network, or a portion thereof. The vehicle transportation network data may include vehicle transportation network control information, such as direction of travel information, speed limit information, toll information, grade information, such as inclination or angle information, surface material information, aesthetic information, defined hazard information, or a combination thereof.

A portion, or a combination of portions, of the vehicle transportation network 220 may be identified as a point of interest or a destination. For example, the vehicle transportation network data may identify a building as a point of interest or destination. The point of interest or destination may be identified using a discrete uniquely identifiable geolocation. For example, the vehicle transportation network 220 may include a defined location, such as a street address, a postal address, a vehicle transportation network address, a GPS address, or a combination thereof for the destination.

Figure 3:
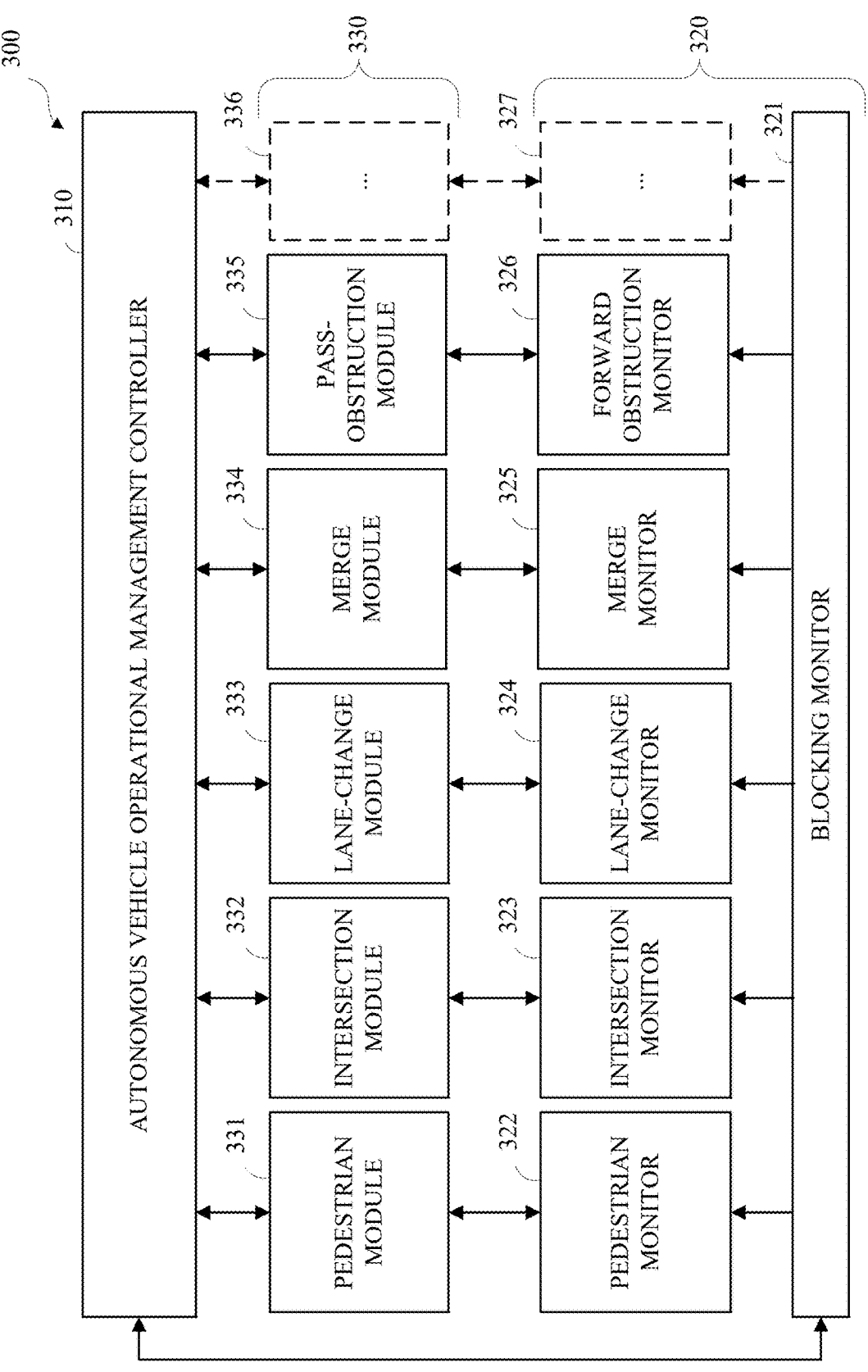
FIG. 3 is a diagram of an example of an autonomous vehicle operational management system in accordance with embodiments of this disclosure.

FIG. 3 is a diagram of an example of an autonomous vehicle operational management system 300 in accordance with embodiments of this disclosure. The autonomous vehicle operational management system 300 may be implemented in an autonomous vehicle, such as the vehicle 100 shown in FIG. 1, one of the vehicles 210/211 shown in FIG. 2, a semi-autonomous vehicle, or any other vehicle implementing autonomous driving.

The autonomous vehicle may traverse a vehicle transportation network, or a portion thereof, which may include traversing distinct vehicle operational scenarios. A distinct vehicle operational scenario may include any distinctly identifiable set of operative conditions that may affect the operation of the autonomous vehicle within a defined spatiotemporal area, or operational environment, of the autonomous vehicle. For example, a distinct vehicle operational scenario may be based on a number or cardinality of roads, road segments, or lanes that the autonomous vehicle may traverse within a defined spatiotemporal distance. In another example, a distinct vehicle operational scenario may be based on one or more traffic control devices that may affect the operation of the autonomous vehicle within a defined spatiotemporal area, or operational environment, of the autonomous vehicle. In another example, a distinct vehicle operational scenario may be based on one or more identifiable rules, regulations, or laws that may affect the operation of the autonomous vehicle within a defined spatiotemporal area, or operational environment, of the autonomous vehicle. In another example, a distinct vehicle operational scenario may be based on one or more identifiable external objects that may affect the operation of the autonomous vehicle within a defined spatiotemporal area, or operational environment, of the autonomous vehicle.

For simplicity and clarity, similar vehicle operational scenarios may be described herein with reference to vehicle operational scenario types or classes. A type or class of a vehicle operation scenario may refer to a defined pattern or a defined set of patterns of the scenario. For example, intersection scenarios may include the autonomous vehicle traversing an intersection, pedestrian scenarios may include the autonomous vehicle traversing a portion of the vehicle transportation network that includes, or is within a defined proximity of, one or more pedestrians, such as wherein a pedestrian is crossing, or approaching, the expected path of the autonomous vehicle; lane-change scenarios may include the autonomous vehicle traversing a portion of the vehicle transportation network by changing lanes; merge scenarios may include the autonomous vehicle traversing a portion of the vehicle transportation network by merging from a first lane to a merged lane; pass-obstruction scenarios may include the autonomous vehicle traversing a portion of the vehicle transportation network by passing an obstacle or obstruction. Although pedestrian vehicle operational scenarios, intersection vehicle operational scenarios, lane-change vehicle operational scenarios, merge vehicle operational scenarios, and pass-obstruction vehicle operational scenarios are described herein, any other vehicle operational scenario or vehicle operational scenario type may be used.

As shown in FIG. 3, the autonomous vehicle operational management system 300 includes an autonomous vehicle operational management controller (AVOMC), operational environment monitors 320, and operation control evaluation models 330.

The AVOMC 310, or another unit of the autonomous vehicle, may control the autonomous vehicle to traverse the vehicle transportation network, or a portion thereof. Controlling the autonomous vehicle to traverse the vehicle transportation network may include monitoring the operational environment of the autonomous vehicle, identifying or detecting distinct vehicle operational scenarios, identifying candidate vehicle control actions based on the distinct vehicle operational scenarios, controlling the autonomous vehicle to traverse a portion of the vehicle transportation network in accordance with one or more of the candidate vehicle control actions, or a combination thereof.

The AVOMC 310 may receive, identify, or otherwise access, operational environment data representing an operational environment for the autonomous vehicle, or one or more aspects thereof. The operational environment of the autonomous vehicle may include a distinctly identifiable set of operative conditions that may affect the operation of the autonomous vehicle within a defined spatiotemporal area of the autonomous vehicle, within a defined spatiotemporal area of an identified route for the autonomous vehicle, or a combination thereof. For example, operative conditions that may affect the operation of the autonomous vehicle may be identified based on sensor data, vehicle transportation network data, route data, or any other data or combination of data representing a defined or determined operational environment for the vehicle.

The operational environment data may include vehicle information for the autonomous vehicle, such as information indicating a geospatial location of the autonomous vehicle, information correlating the geospatial location of the autonomous vehicle to information representing the vehicle transportation network, a route of the autonomous vehicle, a speed of the autonomous vehicle, an acceleration state of the autonomous vehicle, passenger information of the autonomous vehicle, or any other information about the autonomous vehicle or the operation of the autonomous vehicle. The operational environment data may include information representing the vehicle transportation network proximate to the autonomous vehicle, an identified route for the autonomous vehicle, or both. For example, this may include information within a defined spatial distance, such as 300 meters, of portions of the vehicle transportation network along the identified route, information indicating the geometry of one or more aspects of the vehicle transportation network, information indicating a condition, such as a surface condition, of the vehicle transportation network, or any combination thereof. The operational environment data may include information representing external objects within the operational environment of the autonomous vehicle, such as information representing pedestrians, non-human animals, non-motorized transportation devices, such as bicycles or skateboards, motorized transportation devices, such as remote vehicles, or any other external object or entity that may affect the operation of the autonomous vehicle.

Aspects of the operational environment of the autonomous vehicle may be represented within respective distinct vehicle operational scenarios. For example, the relative orientation, trajectory, expected path, of external objects may be represented within respective distinct vehicle operational scenarios. In another example, the relative geometry of the vehicle transportation network may be represented within respective distinct vehicle operational scenarios.

As an example, a first distinct vehicle operational scenario may correspond to a pedestrian crossing a road at a crosswalk, and a relative orientation and expected path of the pedestrian, such as crossing from left to right for crossing from right to left, may be represented within the first distinct vehicle operational scenario. A second distinct vehicle operational scenario may correspond to a pedestrian crossing a road by jaywalking, and a relative orientation and expected path of the pedestrian, such as crossing from left to right for crossing from right to left, may be represented within the second distinct vehicle operational scenario.

The autonomous vehicle may traverse multiple distinct vehicle operational scenarios within an operational environment, which may be aspects of a compound vehicle operational scenario. The autonomous vehicle operational management system 300 may operate or control the autonomous vehicle to traverse the distinct vehicle operational scenarios subject to defined constraints, such as safety constraints, legal constraints, physical constraints, user acceptability constraints, or any other constraint or combination of constraints that may be defined or derived for the operation of the autonomous vehicle.

The AVOMC 310 may monitor the operational environment of the autonomous vehicle, or defined aspects thereof. Monitoring the operational environment of the autonomous vehicle may include identifying and tracking external objects, identifying distinct vehicle operational scenarios, or a combination thereof. For example, the AVOMC 310 may identify and track external objects with the operational environment of the autonomous vehicle. Identifying and tracking the external objects may include identifying spatiotemporal locations of respective external objects, which may be relative to the autonomous vehicle, identifying one or more expected paths for respective external objects, which may include identifying a speed, a trajectory, or both, for an external object. For simplicity and clarity, descriptions of locations, expected locations, paths, expected paths, and the like herein may omit express indications that the corresponding locations and paths refer to geospatial and temporal components; however, unless expressly indicated herein, or otherwise unambiguously clear from context, the locations, expected locations, paths, expected paths, and the like described herein may include geospatial components, temporal components, or both. Monitor the operational environment of the autonomous vehicle may include using operational environment data received from the operational environment monitors 320.

The operational environment monitors 320 may include scenario-agnostic monitors, scenario-specific monitors, or a combination thereof. A scenario-agnostic monitor, such as a blocking monitor 321, may monitor the operational environment of the autonomous vehicle, generate operational environment data representing aspects of the operational environment of the autonomous vehicle, and output the operational environment data to one or more scenario-specific monitor, the AVOMC 310, or a combination thereof. A scenario-specific monitor, such as a pedestrian monitor 322, an intersection monitor 323, a lane-change monitor 324, a merge monitor 325, or a forward obstruction monitor 326, may monitor the operational environment of the autonomous vehicle, generate operational environment data representing scenario-specific aspects of the operational environment of the autonomous vehicle, and output the operational environment data to one or more scenario-specific operation control evaluation models 330, the AVOMC 310, or a combination thereof. For example, the pedestrian monitor 322 may be an operational environment monitor for monitoring pedestrians, the intersection monitor 323 may be an operational environment monitor for monitoring intersections, the lane-change monitor 324 may be an operational environment monitor for monitoring lane-changes, the merge monitor 325 may be an operational environment monitor for merges, and the forward obstruction monitor 326 may be an operational environment monitor for monitoring forward obstructions. An operational environment monitor 327 is shown using broken lines to indicate that the autonomous vehicle operational management system 300 may include any number of operational environment monitors 320.

An operational environment monitor 320 may receive, or otherwise access, operational environment data, such as operational environment data generated or captured by one or more sensors of the autonomous vehicle, vehicle transportation network data, vehicle transportation network geometry data, route data, or a combination thereof. For example, the pedestrian monitor 322 may receive, or otherwise access, information, such as sensor data, which may indicate, correspond to, or may otherwise be associated with, one or more pedestrians in the operational environment of the autonomous vehicle. An operational environment monitor 320 may associate the operational environment data, or a portion thereof, with the operational environment, or an aspect thereof, such as with an external object, such as a pedestrian, a remote vehicle, or an aspect of the vehicle transportation network geometry.

An operational environment monitor 320 may generate, or otherwise identify, information representing one or more aspects of the operational environment, such as with an external object, such as a pedestrian, a remote vehicle, or an aspect of the vehicle transportation network geometry, which may include filtering, abstracting, or otherwise processing the operational environment data. An operational environment monitor 320 may output the information representing the one or more aspects of the operational environment to, or for access by, the AVOMC 310, such by storing the information representing the one or more aspects of the operational environment in a memory, such as the memory 134 shown in FIG. 1, of the autonomous vehicle accessible by the AVOMC 310, sending the information representing the one or more aspects of the operational environment to the AVOMC 310, or a combination thereof. An operational environment monitor 320 may output the operational environment data to one or more elements of the autonomous vehicle operational management system 300, such as the AVOMC 310. Although not shown in FIG. 3, a scenario-specific operational environment monitor 322, 323, 324, 325, 326 may output operational environment data to a scenario-agnostic operational environment monitor, such as the blocking monitor 321.

The pedestrian monitor 322 may correlate, associate, or otherwise process the operational environment data to identify, track, or predict actions of one or more pedestrians. For example, the pedestrian monitor 322 may receive information, such as sensor data, from one or more sensors, which may correspond to one or more pedestrians, the pedestrian monitor 322 may associate the sensor data with one or more identified pedestrians, which may include may identifying a direction of travel, a path, such as an expected path, a current or expected velocity, a current or expected acceleration rate, or a combination thereof for one or more of the respective identified pedestrians, and the pedestrian monitor 322 may output the identified, associated, or generated pedestrian information to, or for access by, the AVOMC 310.

The intersection monitor 323 may correlate, associate, or otherwise process the operational environment data to identify, track, or predict actions of one or more remote vehicles in the operational environment of the autonomous vehicle, to identify an intersection, or an aspect thereof, in the operational environment of the autonomous vehicle, to identify vehicle transportation network geometry, or a combination thereof. For example, the intersection monitor 323 may receive information, such as sensor data, from one or more sensors, which may correspond to one or more remote vehicles in the operational environment of the autonomous vehicle, the intersection, or one or more aspects thereof, in the operational environment of the autonomous vehicle, the vehicle transportation network geometry, or a combination thereof, the intersection monitor 323 may associate the sensor data with one or more identified remote vehicles in the operational environment of the autonomous vehicle, the intersection, or one or more aspects thereof, in the operational environment of the autonomous vehicle, the vehicle transportation network geometry, or a combination thereof, which may include may identifying a current or expected direction of travel, a path, such as an expected path, a current or expected velocity, a current or expected acceleration rate, or a combination thereof for one or more of the respective identified remote vehicles. The intersection monitor 323 may output the identified, associated, or generated intersection information to, or for access by, the AVOMC 310.

The lane-change monitor 324 may correlate, associate, or otherwise process the operational environment data to identify, track, or predict actions of one or more remote vehicles in the operational environment of the autonomous vehicle, such as information indicating a slow or stationary remote vehicle along the expected path of the autonomous vehicle, to identify one or more aspects of the operational environment of the autonomous vehicle, such as vehicle transportation network geometry in the operational environment of the autonomous vehicle, or a combination thereof geospatially corresponding to a lane-change operation. For example, the lane-change monitor 324 may receive information, such as sensor data, from one or more sensors, which may correspond to one or more remote vehicles in the operational environment of the autonomous vehicle, one or more aspects of the operational environment of the autonomous vehicle in the operational environment of the autonomous vehicle or a combination thereof geospatially corresponding to a lane-change operation, the lane-change monitor 324 may associate the sensor data with one or more identified remote vehicles in the operational environment of the autonomous vehicle, one or more aspects of the operational environment of the autonomous vehicle or a combination thereof geospatially corresponding to a lane-change operation, which may include may identifying a current or expected direction of travel, a path, such as an expected path, a current or expected velocity, a current or expected acceleration rate, or a combination thereof for one or more of the respective identified remote vehicles. The lane-change monitor 324 may output the identified, associated, or generated lane-change information to, or for access by, the AVOMC 310

The merge monitor 325 may correlate, associate, or otherwise process the operational environment information to identify, track, or predict actions of one or more remote vehicles in the operational environment of the autonomous vehicle, to identify one or more aspects of the operational environment of the autonomous vehicle, such as vehicle transportation network geometry in the operational environment of the autonomous vehicle, or a combination thereof geospatially corresponding to a merge operation. For example, the merge monitor 325 may receive information, such as sensor data, from one or more sensors, which may correspond to one or more remote vehicles in the operational environment of the autonomous vehicle, one or more aspects of the operational environment of the autonomous vehicle in the operational environment of the autonomous vehicle or a combination thereof geospatially corresponding to a merge operation, the merge monitor 325 may associate the sensor data with one or more identified remote vehicles in the operational environment of the autonomous vehicle, one or more aspects of the operational environment of the autonomous vehicle or a combination thereof geospatially corresponding to a merge operation, which may include identifying a current or expected direction of travel, a path, such as an expected path, a current or expected velocity, a current or expected acceleration rate, or a combination thereof for one or more of the respective identified remote vehicles. The merge monitor 325 may output the identified, associated, or generated merge information to, or for access by, the AVOMC 310.

The forward obstruction monitor 326 may correlate, associate, or otherwise process the operational environment information to identify one or more aspects of the operational environment of the autonomous vehicle geospatially corresponding to a forward pass-obstruction operation. For example, the forward obstruction monitor 326 may identify vehicle transportation network geometry in the operational environment of the autonomous vehicle. The forward obstruction monitor 326 may identify one or more obstructions or obstacles in the operational environment of the autonomous vehicle, such as a slow or stationary remote vehicle along the expected path of the autonomous vehicle or along an identified route for the autonomous vehicle; and the forward obstruction monitor 326 may identify, track, or predict actions of one or more remote vehicles in the operational environment of the autonomous vehicle. The forward obstruction monitor 326 may receive information, such as sensor data, from one or more sensors, which may correspond to one or more remote vehicles in the operational environment of the autonomous vehicle, one or more aspects of the operational environment of the autonomous vehicle in the operational environment of the autonomous vehicle or a combination thereof geospatially corresponding to a forward pass-obstruction operation. The forward obstruction monitor 326 may associate the sensor data with one or more identified remote vehicles in the operational environment of the autonomous vehicle, one or more aspects of the operational environment of the autonomous vehicle or a combination thereof geospatially corresponding to the forward pass-obstruction operation, which may include may identifying a current or expected direction of travel, a path, such as an expected path, a current or expected velocity, a current or expected acceleration rate, or a combination thereof for one or more of the respective identified remote vehicles. The forward obstruction monitor 326 may output the identified, associated, or generated forward obstruction information to, or for access by, the AVOMC 310.

The blocking monitor 321 may receive operational environment data representing an operational environment, or an aspect thereof, for the autonomous vehicle. The blocking monitor 321 may determine a respective probability of availability, or corresponding blocking probability, for one or more portions of the vehicle transportation network, such as portions of the vehicle transportation network proximal to the autonomous vehicle, which may include portions of the vehicle transportation network corresponding to an expected path of the autonomous vehicle, such as an expected path identified based on a current route of the autonomous vehicle. A probability of availability, or corresponding blocking probability, may indicate a probability or likelihood that the autonomous vehicle may traverse a portion of, or spatial location within, the vehicle transportation network safely, such as unimpeded by an external object, such as a remote vehicle or a pedestrian. The blocking monitor 321 may determine, or update, probabilities of availability continually or periodically. The blocking monitor 321 may communicate probabilities of availability, or corresponding blocking probabilities, to the AVOMC 310.

The AVOMC 310 may identify one or more distinct vehicle operational scenarios based on one or more aspects of the operational environment represented by the operational environment data. For example, the AVOMC 310 may identify a distinct vehicle operational scenario in response to identifying, or based on, the operational environment data indicated by one or more of the operational environment monitors 320. The distinct vehicle operational scenario may be identified based on route data, sensor data, or a combination thereof. For example, the AVOMC 310 may identify one or multiple distinct vehicle operational scenarios corresponding to an identified route for the vehicle, such as based on map data corresponding to the identified route, in response to identifying the route. Multiple distinct vehicle operational scenarios may be identified based on one or more aspects of the operational environment represented by the operational environment data. For example, the operational environment data may include information representing a pedestrian approaching an intersection along an expected path for the autonomous vehicle, and the AVOMC 310 may identify a pedestrian vehicle operational scenario, an intersection vehicle operational scenario, or both.

The AVOMC 310 may instantiate respective instances of one or more of the operation control evaluation models 330 based on one or more aspects of the operational environment represented by the operational environment data. The operation control evaluation models 330 may include scenario-specific operation control evaluation model (SSOCEMs), such as a pedestrian-SSOCEM 331, an intersection-SSOCEM 332, a lane-change-SSOCEM 333, a merge-SSOCEM 334, a pass-obstruction-SSOCEM 335, or a combination thereof. A SSOCEM 336 is shown using broken lines to indicate that the autonomous vehicle operational management system 300 may include any number of SSOCEMs 330. For example, the AVOMC 310 may instantiate an instance of a SSOCEM 330 in response to identifying a distinct vehicle operational scenario. The AVOMC 310 may instantiate multiple instances of one or more SSOCEMs 330 based on one or more aspects of the operational environment represented by the operational environment data. For example, the operational environment data may indicate two pedestrians in the operational environment of the autonomous vehicle and the AVOMC 310 may instantiate a respective instance of the pedestrian-SSOCEM 331 for each pedestrian based on one or more aspects of the operational environment represented by the operational environment data.

The AVOMC 310 may send the operational environment data, or one or more aspects thereof, to another unit of the autonomous vehicle, such as the blocking monitor 321 or one or more instances of the SSOCEMs 330. For example, the AVOMC 310 may communicate the probabilities of availability, or corresponding blocking probabilities, received from the blocking monitor 321 to respective instantiated instances of the SSOCEMs 330. The AVOMC 310 may store the operational environment data, or one or more aspects thereof, such as in a memory, such as the memory 134 shown in FIG. 1, of the autonomous vehicle.

Controlling the autonomous vehicle to traverse the vehicle transportation network may include identifying candidate vehicle control actions based on the distinct vehicle operational scenarios, controlling the autonomous vehicle to traverse a portion of the vehicle transportation network in accordance with one or more of the candidate vehicle control actions, or a combination thereof. For example, the AVOMC 310 may receive one or more candidate vehicle control actions from respective instances of the SSOCEMs 330. The AVOMC 310 may identify a vehicle control action from the candidate vehicle control actions, and may control the vehicle, or may provide the identified vehicle control action to another vehicle control unit, to traverse the vehicle transportation network in accordance with the vehicle control action.

A vehicle control action may indicate a vehicle control operation or maneuver, such as accelerating, decelerating, turning, stopping, or any other vehicle operation or combination of vehicle operations that may be performed by the autonomous vehicle in conjunction with traversing a portion of the vehicle transportation network. For example, an 'advance' vehicle control action may include slowly inching forward a short distance, such as a few inches or a foot; an 'accelerate' vehicle control action may include accelerating a defined acceleration rate, or at an acceleration rate within a defined range; a 'decelerate' vehicle control action may include decelerating a defined deceleration rate, or at a deceleration rate within a defined range; a 'maintain' vehicle control action may include maintaining current operational parameters, such as by maintaining a current velocity, a current path or route, or a current lane orientation; and a 'proceed' vehicle control action may include beginning or resuming a previously identified set of operational parameters. Although some vehicle control actions are described herein, other vehicle control actions may be used.

A vehicle control action may include one or more performance metrics. For example, a 'stop' vehicle control action may include a deceleration rate as a performance metric. In another example, a 'proceed' vehicle control action may expressly indicate route or path information, speed information, an acceleration rate, or a combination thereof as performance metrics, or may expressly or implicitly indicate that a current or previously identified path, speed, acceleration rate, or a combination thereof may be maintained. A vehicle control action may be a compound vehicle control action, which may include a sequence, combination, or both of vehicle control actions. For example, an 'advance' vehicle control action may indicate a 'stop' vehicle control action, a subsequent 'accelerate' vehicle control action associated with a defined acceleration rate, and a subsequent 'stop' vehicle control action associated with a defined deceleration rate, such that controlling the autonomous vehicle in accordance with the 'advance' vehicle control action includes controlling the autonomous vehicle to slowly inch forward a short distance, such as a few inches or a foot.

The AVOMC 310 may uninstantiate an instance of a SSOCEM 330. For example, the AVOMC 310 may identify a distinct set of operative conditions as indicating a distinct vehicle operational scenario for the autonomous vehicle, instantiate an instance of a SSOCEM 330 for the distinct vehicle operational scenario, monitor the operative conditions, subsequently determine that one or more of the operative conditions has expired, or has a probability of affecting the operation of the autonomous vehicle below a defined threshold, and the AVOMC 310 may uninstantiate the instance of the SSOCEM 330.

The AVOMC 310 may instantiate and uninstantiate instances of SSOCEMs 330 based on one or more vehicle operational management control metrics, such as an immanency metric, an urgency metric, a utility metric, an acceptability metric, or a combination thereof. An immanency metric may indicate, represent, or be based on, a spatial, temporal, or spatiotemporal distance or proximity, which may be an expected distance or proximity, for the vehicle to traverse the vehicle transportation network from a current location of the vehicle to a portion of the vehicle transportation network corresponding to a respective identified vehicle operational scenario. An urgency metric may indicate, represent, or be based on, a measure of the spatial, temporal, or spatiotemporal distance available for controlling the vehicle to traverse a portion of the vehicle transportation network corresponding to a respective identified vehicle operational scenario. A utility metric may indicate, represent, or be based on, an expected value of instantiating an instance of a SSOCEM 330 corresponding to a respective identified vehicle operational scenario. An acceptability metric may be a safety metric, such a metric indicating collision avoidance, a vehicle transportation network control compliance metric, such as a metric indicating compliance with vehicle transportation network rules and regulations, a physical capability metric, such as a metric indicating a maximum braking capability of the vehicle, a user defined metric, such as a user preference. Other metrics, or combinations of metrics may be used. A vehicle operational management control metric may indicate a defined rate, range, or limit. For example, an acceptability metric may indicate a defined target rate of deceleration, a defined range of deceleration rates, or a defined maximum rate of deceleration.

A SSOCEM 330 may include one or more models of a respective distinct vehicle operational scenario. The autonomous vehicle operational management system 300 may include any number of SSOCEMs 330, each including models of a respective distinct vehicle operational scenario. A SSOCEM 330 may include one or more models from one or more types of models. For example, a SSOCEM 330 may include a Partially Observable Markov Decision Process (POMDP) model, a Markov Decision Process (MDP) model, a Classical Planning model, a Partially Observable Stochastic Game (POSG) model, a Decentralized Partially Observable Markov Decision Process (Dec-POMDP) model, a Reinforcement Learning (RL) model, an artificial neural network model, or any other model of a respective distinct vehicle operational scenario. Each different type of model may have respective characteristics for accuracy and resource utilization. For example, a POMDP model for a defined scenario may have greater accuracy and greater resource utilization than an MDP model for the defined scenario. The models included in a SSOCEM 330 may be ordered, such as hierarchically, such as based on accuracy. For example, a designated model, such as the most accurate model included in an SSOCEM 330, may be identified as the primary model for the SSOCEM 330 and other models included in the SSOCEM 330 may be identified as secondary models.

In an example, one or more of the SSOCEMs 330 may include a POMDP model, which may be a single-agent model. A POMDP model may model a distinct vehicle operational scenario, which may include modeling uncertainty, using a set of states ($\mathcal{S}$), a set of actions ($\mathcal{A}$), a set of observations ($\mathcal{O}$), a set of state transition probabilities (T), a set of conditional observation probabilities (Z), a reward function (R), a discount factor ($\gamma$), or a combination thereof. A POMDP model may be defined or described as a tuple $<\mathcal{S}, \mathcal{A}, \mathcal{O}, T, Z, R, \gamma>$.

A state from the set of states ($\mathcal{S}$), may represent a distinct condition of respective defined aspects, such as external objects and traffic control devices, of the operational environment of the autonomous vehicle that may probabilistically affect the operation of the autonomous vehicle at a discrete temporal location. A respective set of states ($\mathcal{S}$) may be defined for each distinct vehicle operational scenario. Each state (state space), from a set of states ($\mathcal{S}$) may include one or more defined state factors. Although some examples of state factors for some models are described herein, a model, including any model described herein, may include any number, or cardinality, of state factors. Each state factor may represent a defined aspect of the respective scenario, and may have a respective defined set of values. Although some examples of state factor values for some state factors are described herein, a state factor, including any state factor described herein, may include any number, or cardinality, of values.

An action from the set of actions ($\mathcal{A}$) may indicate an available vehicle control action at each state in the set of states ($\mathcal{S}$). A respective set of actions may be defined for each distinct vehicle operational scenario. Each action (action space), from a set of actions ($\mathcal{A}$) may include one or more defined action factors. Although some examples of action factors for some models are described herein, a model, including any model described herein, may include any number, or cardinality, of action factors. Each action factor may represent an available vehicle control action, and may have a respective defined set of values. Although some examples of action factor values for some action factors are described herein, an action factor, including any action factor described herein, may include any number, or cardinality, of values.

An observation from the set of observations ($\mathcal{O}$) may indicate available observable, measurable, or determinable data for each state from the set of states ($\mathcal{S}$). A respective set of observations may be defined for each distinct vehicle operational scenario. Each observation (observation space), from a set of observations ($\mathcal{O}$) may include one or more defined observation factors. Although some examples of observation factors for some models are described herein, a model, including any model described herein, may include any number, or cardinality, of observation factors. Each observations factor may represent available observations, and may have a respective defined set of values. Although some examples of observation factor values for some observation factors are described herein, an observation factor, including any observation factor described herein, may include any number, or cardinality, of values.

A state transition probability from the set of state transition probabilities (T) may probabilistically represent changes to the operational environment of the autonomous vehicle, as represented by the set of states ($\mathcal{S}$), responsive to the actions of the autonomous vehicle, as represented by the set of actions ($\mathcal{A}$), which may be expressed as T:$\mathcal{S} \times \mathcal{A} \times \mathcal{S} \rightarrow [0, 1]$. A respective set of state transition probabilities (T) may be defined for each distinct vehicle operational scenario. Although some examples of state transition probabilities for some models are described herein, a model, including any model described herein, may include any number, or cardinality, of state transition probabilities. For example, each combination of a state, an action, and a subsequent state may be associated with a respective state transition probability.

A conditional observation probability from the set of conditional observation probabilities (Z) may represent probabilities of making respective observations ($\mathcal{O}$) based on the operational environment of the autonomous vehicle, as represented by the set of states(S) ($\mathcal{S}$), responsive to the actions of the autonomous vehicle, as represented by the set of actions ($\mathcal{A}$), which may be represented as Z: $\mathcal{A} \times \mathcal{S} \times \mathcal{O} \rightarrow [0, 1]$. A respective set of conditional observation probabilities (Z) may be defined for each distinct vehicle operational scenario. Although some examples of state conditional observation probabilities for some models are described herein, a model, including any model described herein, may include any number, or cardinality, of conditional observation probabilities. For example, each combination of an action, a subsequent state, and an observation may be associated with a respective conditional observation probability.

The reward function (R) may determine a respective positive or negative (cost) value that may be accrued for each combination of state and action, which may represent an expected value of the autonomous vehicle traversing the vehicle transportation network from the corresponding state in accordance with the corresponding vehicle control action to the subsequent state, which may be expressed as R: $\mathcal{S} \times \mathcal{A} \rightarrow \mathbb{R}$.

For simplicity and clarity, the examples of values of a model, such as state factor values or observation factor values, described herein include categorical representations, such as {start, goal} or {short, long}. The categorical values may represent defined discrete values, which may be relative values. For example, a state factor representing a temporal aspect may have values from the set {short, long}; the value 'short' may represent discrete values, such as a temporal distance, within, or less than, a defined threshold, such as three seconds, and the value 'long' may represent discrete values, such as a temporal distance, of at least, such as equal to or greater than, the defined threshold. Defined thresholds for respective categorical values may be defined relative to associated factors. For example, a defined threshold for the set {short, long} for a temporal factor may be associated with a relative spatial location factor value and another defined threshold for the set {short, long} for the temporal factor may be associated with another relative spatial location factor value. Although categorical representations of factor values are described herein, other representations, or combinations of representations, may be used. For example, a set of temporal state factor values may be {short (representing values of less than three seconds), 4, 5, 6, long (representing values of at least 7 seconds)}.

In some embodiments, such as embodiments implementing a POMDP model, modeling an autonomous vehicle operational control scenario may include modeling occlusions. For example, the operational environment data may include information corresponding to one or more occlusions, such as sensor occlusions, in the operational environment of the autonomous vehicle such that the operational environment data may omit information representing one or more occluded external objects in the operational environment of the autonomous vehicle. For example, an occlusion may be an external object, such as a traffic signs, a building, a tree, an identified external object, or any other operational condition or combination of operational conditions capable of occluding one or more other operational conditions, such as external objects, from the autonomous vehicle at a defined spatiotemporal location. In some embodiments, an operational environment monitor 320 may identify occlusions, may identify or determine a probability that an external object is occluded, or hidden, by an identified occlusion, and may include occluded vehicle probability information in the operational environment data output to the AVOMC 310, and communicated, by the AVOMC 310, to the respective SSOCEMs 330.

The autonomous vehicle operational management system 300 may include any number or combination of types of models. For example, the pedestrian-SSOCEM 331, the intersection-SSOCEM 332, the lane-change-SSOCEM 333, the merge-SSOCEM 334, and the pass-obstruction-SSOCEM 335 may be POMDP models. In another example, the pedestrian-SSOCEM 331 may be a MDP model and the intersection-SSOCEM 332 may be a POMDP model. The AVOMC 310 may instantiate any number of instances of the SSOCEMs 330 based on the operational environment data.

Instantiating a SSOCEM 330 instance may include identifying a model from the SSOCEM 330, and instantiating an instance of the identified model. For example, a SSOCEM 330 may include a primary model and a secondary model for a respective distinct vehicle operational scenario, and instantiating the SSOCEM 330 may include identifying the primary model as a current model and instantiating an instance of the primary model. Instantiating a model may include determining whether a solution or policy is available for the model. Instantiating a model may include determining whether an available solution or policy for the model is partially solved, or is convergent and solved. Instantiating a SSOCEM 330 may include instantiating an instance of a solution or policy for the identified model for the SSOCEM 330.

Solving a model, such as a POMDP model, may include determining a policy or solution, which may be a function, that maximizes an accrued reward, which may be determined by evaluating the possible combinations of the elements of the tuple, such as $<\mathcal{S}, \mathcal{A}, \mathcal{O}, T, Z, R, \gamma>$, that defines the model. A policy or solution may identify or output a reward maximized, or optimal, candidate vehicle control action based on identified belief state data. The identified belief state data, which may be probabilistic, may indicate current state data, such as a current set of state values for the respective model, or a probability for the current set of state values, and may correspond with a respective relative temporal location. For example, solving a MDP model may include identifying a state from the set of states ($\mathcal{S}$), identifying an action from the set of action ($\mathcal{A}$), determining a subsequent, or successor, state from the set of states ($\mathcal{S}$) subsequent to simulating the action subject to the state transition probabilities. Each state may be associated with a corresponding utility value, and solving the MDP model may include determining respective utility values corresponding to each possible combination of state, action, and subsequent state. The utility value of the subsequent state may be identified as the maximum identified utility value subject to a reward, or penalty, which may be a discounted reward, or penalty. The policy may indicate an action corresponding to the maximum utility value for a respective state. Solving a POMDP model may be similar to solving the MDP model, except based on belief states, representing probabilities for respective states and subject to observation probabilities corresponding generating observations for respective states. Thus, solving the SSOCEM model includes evaluating the possible state-action-state transitions and updating respective belief states, such as using Bayes rule, based on respective actions and observations.

In some implementations, a model, such as a MDP model or a POMDP model, may reduce the resource utilization associated with solving the corresponding model by evaluating the states, belief states, or both, modeled therein to identify computations corresponding to the respective states, belief states, or both that may be omitted and omitting performing the identified computations, which may include obtaining or maintaining a measure of current quality, such as upper and lower bounds on utility for the respective state, belief state, or both. In some implementations, solving a model may include parallel processing, such as parallel processing using multiple processor cores or using multiple processors, which may include graphics processing units (GPUs). In some implementations, solving a model may include obtaining an approximation of the model, which may improve the efficiency of solving the model.

Figure 4:
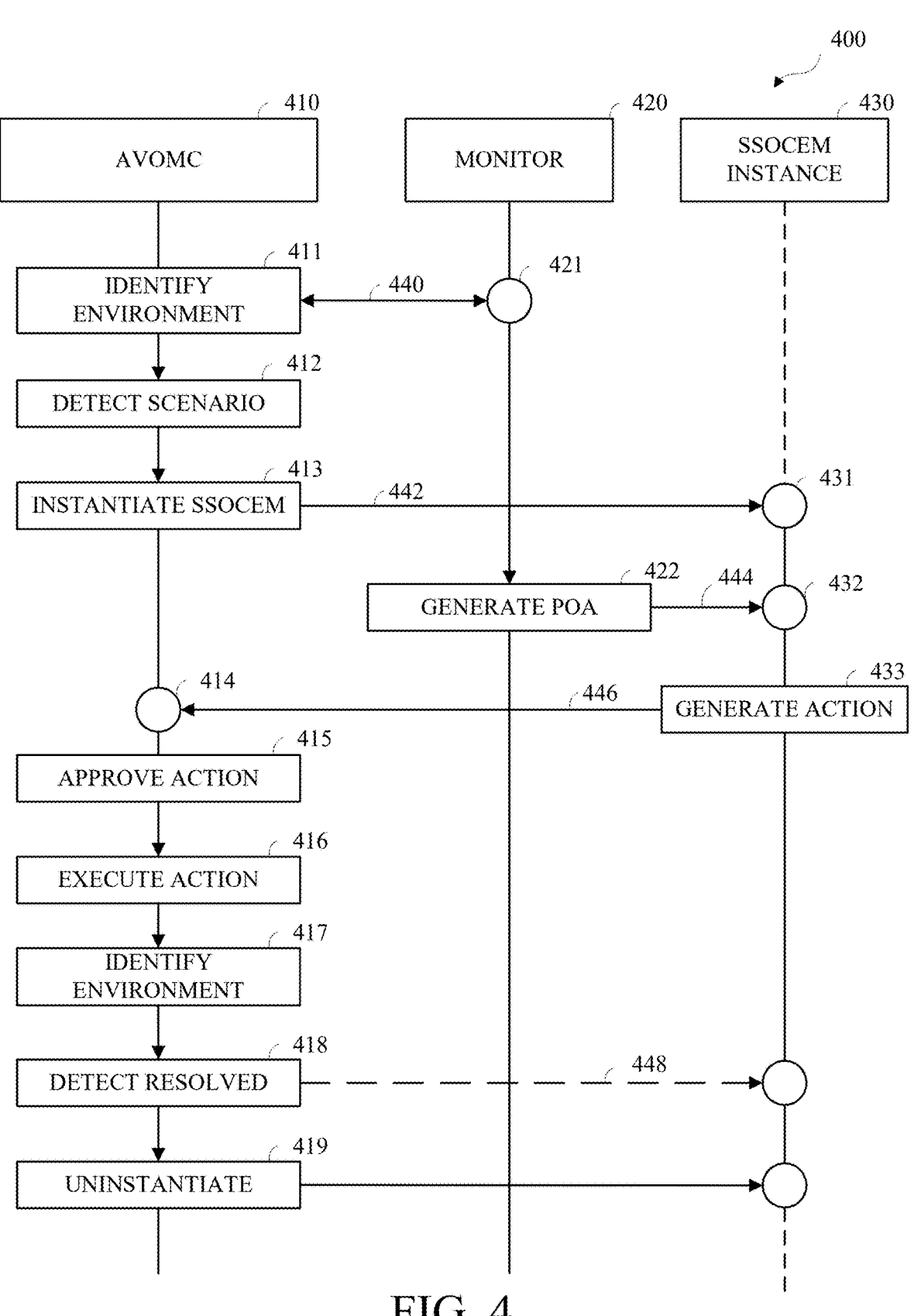
FIG. 4 is a flow diagram of an example of an autonomous vehicle operational management in accordance with embodiments of this disclosure.

FIG. 4 is a flow diagram of an example of autonomous vehicle operational management 400 in accordance with embodiments of this disclosure. Autonomous vehicle operational management 400 may be implemented in an autonomous vehicle, such as the vehicle 100 shown in FIG. 1, one of the vehicles 210/211 shown in FIG. 2, a semi-autonomous vehicle, or any other vehicle implementing autonomous driving. For example, an autonomous vehicle may implement an autonomous vehicle operational management system, such as the autonomous vehicle operational management system 300 shown in FIG. 3.

As shown in FIG. 4, autonomous vehicle operational management 400 includes implementing or operating the autonomous vehicle operational management system, including one or more models, devices, or components thereof, which may include operating an autonomous vehicle operational management controller (AVOMC) 410, such as the AVOMC 310 shown in FIG. 3; operating operational environment monitors 420, such as one or more of the operational environment monitors 320 shown in FIG. 3; and operating a scenario-specific operational control evaluation model instance (SSOCEM instance) 430, such as an instance of a SSOCEM 330 shown in FIG. 3.

The AVOMC 410 may monitor the operational environment of the autonomous vehicle, or defined aspects thereof, at 411 to identify an operational environment, or an aspect thereof, of the autonomous vehicle. For example, operational environment monitors 420 may monitor scenario-specific aspects of the operational environment and may send operational environment data representing the operational environment to the AVOMC 410. Monitoring the operational environment of the autonomous vehicle may include identifying and tracking external objects at 411, identifying distinct vehicle operational scenarios at 412, or a combination thereof. For example, the AVOMC 410, the operational environment monitors 420, or both, may identify the operational environment data based on sensor data, vehicle data, route data, vehicle transportation network data, previously identified operational environment data, or any other available data, or combination of data, describing an aspect or aspects of the operational environment.

Identifying the operational environment may include identifying operational environment data representing the operational environment, or one or more aspects thereof. The operational environment data may include vehicle information for the autonomous vehicle, information representing the vehicle transportation network, or one or more aspects thereof, proximate to the autonomous vehicle, information representing external objects, or one or more aspects thereof, within the operational environment of the autonomous vehicle, along or proximate to a route identified for the autonomous vehicle, or a combination thereof. The sensor information may be processed sensor information, such as processed sensor information from a sensor information processing unit of the autonomous vehicle, which may receive sensor information from the sensor of the autonomous vehicle and may generate the processed sensor information based on the sensor information.

Identifying the operational environment data may include receiving information indicating one or more aspects of the operational environment from a sensor of the autonomous vehicle, such as the sensor 136 shown in FIG. 1 or the on-vehicle sensors described in FIG. 2. The sensor, or another unit of the autonomous vehicle, may store the sensor information in a memory, such as the memory 134 shown in FIG. 1, of the autonomous vehicle, and the AVOMC 410 may read the sensor information from the memory.

Identifying the operational environment data may include identifying information indicating one or more aspects of the operational environment from vehicle transportation network data. For example, the AVOMC 410 may read, or otherwise receive, vehicle transportation network data indicating that the autonomous vehicle is approaching an intersection, or otherwise describing a geometry or configuration of the vehicle transportation network proximate to the autonomous vehicle, such as within a maximum of 300 meters of the autonomous vehicle.

Identifying the operational environment data at 411 may include identifying information indicating one or more aspects of the operational environment from a remote vehicle or other remote device external to the autonomous vehicle. For example, the autonomous vehicle may receive, from a remote vehicle, via a wireless electronic communication link, a remote vehicle message including remote vehicle information indicating remote vehicle geospatial state information for the remote vehicle, remote vehicle kinematic state information for the remote vehicle, or both.

Identifying the operational environment data may include identifying information indicating one or more aspects of the operational environment from route data representing an identified route for the autonomous vehicle. For example, the AVOMC 410 may read, or otherwise receive, vehicle transportation network data representing an identified route, such as a route identified in response to user input, for the autonomous vehicle.

The AVOMC 410 and the operational environment monitors 420 may communicate to identify the operational environment information as indicated at 411, 440, and 421. Alternatively, or in addition, the operational environment monitors 420 may receive the operational environment data from another component of the autonomous vehicle, such as from a sensor of the autonomous vehicle or from another operational environment monitor 420, or the operational environment monitors 420 may read the operational environment data from a memory of the autonomous vehicle.

The AVOMC 410 may detect or identify one or more distinct vehicle operational scenarios at 412, such as based on one or more aspects of the operational environment represented by the operational environment data identified at 411.

The AVOMC 410 may instantiate a SSOCEM instance 430 based on one or more aspects of the operational environment represented by the operational environment data at 413, such as in response to identifying a distinct vehicle operational scenario at 412. Although one SSOCEM instance 430 is shown in FIG. 4, the AVOMC 410 may instantiate multiple SSOCEM instances 430 based on one or more aspects of the operational environment represented by the operational environment data identified at 411, each SSOCEM instance 430 corresponding to a respective distinct vehicle operational scenario detected at 412, or a combination of a distinct external object identified at 411 and a respective distinct vehicle operational scenario detected at 412. Instantiating a SSOCEM instance 430 at 413 may include sending the operational environment data representing an operational environment for the autonomous vehicle to the SSOCEM instance 430 as indicated at 442. The SSOCEM instance 430 may receive the operational environment data representing an operational environment for the autonomous vehicle, or one or more aspects thereof, at 431. Instantiating a SSOCEM instance 430 at 413 may include identifying a model, such as a primary model or a secondary model, of the distinct vehicle operational scenario, instantiating an instance of the model, identifying a solution or policy corresponding to the model, instantiating an instance of the solution or policy, or a combination thereof.

The operational environment monitors 420 may include a blocking monitor, such as the blocking monitor 321 shown in FIG. 3, which may determine a respective probability of availability (POA), or corresponding blocking probability, at 422 for one or more portions of the vehicle transportation network, such as portions of the vehicle transportation network proximal to the autonomous vehicle, which may include portions of the vehicle transportation network corresponding to an expected path of the autonomous vehicle, such as an expected path identified based on a current route of the autonomous vehicle. The blocking monitor may send the probabilities of availability identified at 422 to the SSOCEM instance 430 at 444. Alternatively, or in addition, the blocking monitor may store the probabilities of availability identified at 422 in a memory of the autonomous vehicle. Although not expressly shown in FIG. 4, the blocking monitor may send the probabilities of availability identified at 422 to the AVOMC 410 at 444 in addition to, or in alternative to, sending the probabilities of availability to the SSOCEM instance 430. The SSOCEM instance 430 may receive the probabilities of availability at 432.

The SSOCEM instance 430 may generate or identify a candidate vehicle control action at 433. For example, the SSOCEM instance 430 may generate or identify the candidate vehicle control action at 433 in response to receiving the operational environment data 431, receiving the probability of availability data at 432, or both. For example, the instance of the solution or policy instantiated at 431 for the model of the distinct vehicle operational scenario may output the candidate vehicle control action based on the operational environment data, the probability of availability data, or both. The SSOCEM instance 430 may send the candidate vehicle control action identified at 433 to the AVOMC 410 at 446. Alternatively, or in addition, the SSOCEM instance 430 may store the candidate vehicle control action identified at 433 in a memory of the autonomous vehicle.

The AVOMC 410 may receive a candidate vehicle control action at 414. For example, the AVOMC 410 may receive the candidate vehicle control action from the SSOCEM instance 430 at 414. Alternatively, or in addition, the AVOMC 410 may read the candidate vehicle control action from a memory of the autonomous vehicle.

The AVOMC 410 may approve the candidate vehicle control action, or otherwise identify the candidate vehicle control action as a vehicle control action for controlling the autonomous vehicle to traverse the vehicle transportation network, at 415. Approving a candidate vehicle control action at 415 may include determining whether to traverse a portion of the vehicle transportation network in accordance with the candidate vehicle control action.

The AVOMC 410 may control, or may provide the identified vehicle control action to another vehicle control unit to control, the autonomous vehicle to traverse the vehicle transportation network, or a portion thereof, at 416 in accordance with the vehicle control action identified at 415.

The AVOMC 410 may identify an operational environment, or an aspect thereof, of the autonomous vehicle at 417. Identifying an operational environment, or an aspect thereof, of the autonomous vehicle at 417 may be similar to identifying the operational environment of the autonomous vehicle at 411 and may include updating previously identified operational environment data.

The AVOMC 410 may determine or detect whether a distinct vehicle operational scenario is resolved or unresolved at 418. For example, the AVOMC 410 may receive operation environment information continuously or on a periodic basis, as described above. The AVOMC 410 may evaluate the operational environment data to determine whether the distinct vehicle operational scenario has resolved.

The AVOMC 410 may determine that the distinct vehicle operational scenario corresponding to the SSOCEM instance 430 is unresolved at 418, the AVOMC 410 may send the operational environment data identified at 417 to the SSOCEM instances 430 as indicated at 448, and uninstantiating the SSOCEM instance 430 at 418 may be omitted or modified.

The AVOMC 410 may determine that the distinct vehicle operational scenario is resolved at 418 and may uninstantiate at 419 the SSOCEM instances 430 corresponding to the distinct vehicle operational scenario determined to be resolved at 418. For example, the AVOMC 410 may identify a distinct set of operative conditions forming the distinct vehicle operational scenario for the autonomous vehicle at 412, may determine that one or more of the operative conditions has expired, or has a probability of affecting the operation of the autonomous vehicle below a defined threshold at 418, and may uninstantiate the corresponding SSOCEM instance 430.

Although not expressly shown in FIG. 4, the AVOMC 410 may continually, such as periodically, repeat identifying or updating the operational environment data at 417, determining whether the distinct vehicle operational scenario is resolved at 418, and, in response to determining that the distinct vehicle operational scenario is unresolved at 418, sending the operational environment data identified at 417 to the SSOCEM instances 430 as indicated at 448, until determining whether the distinct vehicle operational scenario is resolved at 418 includes determining that the distinct vehicle operational scenario is resolved.

Figure 5:
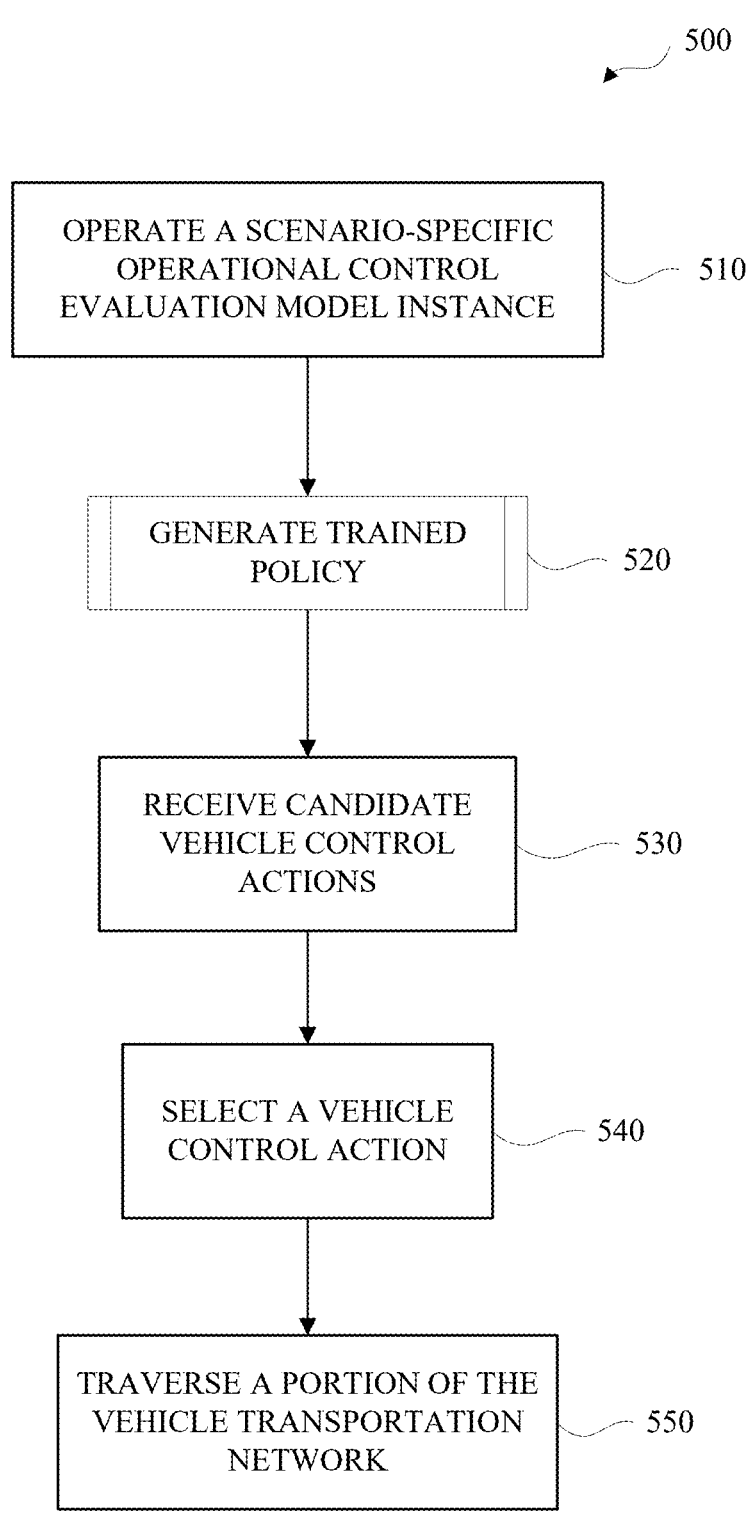
FIG. 5 is a flow diagram of an example method for traversing a vehicle transportation network in accordance with embodiments of this disclosure.

FIG. 5 is a flow diagram of an example method 500 for traversing a vehicle transportation network in accordance with embodiments of this disclosure. The method 500 may be implemented in an autonomous vehicle, such as the vehicle 100 shown in FIG. 1, one of the vehicles 210/211 shown in FIG. 2, a semi-autonomous vehicle, or any other vehicle implementing autonomous driving. For example, an autonomous vehicle may implement the method 500 using an autonomous vehicle operational management system, such as the autonomous vehicle operational management system 300 shown in FIG. 3. In some implementations described herein, the method 500 may be implemented in a remote assistance or support center, such as by a control center incorporating the communication device 240.

As shown in FIG. 5, the method 500 includes operating 510 an instance of a scenario-specific operational control evaluation model. The scenario-specific control evaluation model may model a distinct vehicle operational scenario. Operating 510 the instance may depend upon a multi-objective policy for the SSOCEM. The multi-objective policy may include at least two objectives (e.g., at least a first objective and a second objective), and may include a priority of the first objective relative to the second objective.

That is, each SSOCEM may be defined with multiple objectives. The objectives can include risk, aggressiveness, behavior preferences, comfort, social acceptability, time and/or speed to complete the selected vehicle control action, or any combination thereof. In some examples, social acceptability may be based on social niceties that differ by country, region, or town.

The multi-objective policy may be based on topological MDPs (TMDPs) and topological POMDPs (TPOMDPs). For example, the multi-objective policy may include data for separate objectives for the same problem. In some examples, the data may include one or more topological graphs. The topological graphs may be used to show the relationship between the objectives (e.g., the priority of each objective as compared to others). The edges in the graphs may define a constraint relationship restricting the policies of different objectives. The graph may arrange the objectives from the most important objective to the least important objective as described in additional detail below.

The multi-objective policy may be a default policy, or the multi-objective policy may be a retrained policy associated with the SSOCEM instance. Accordingly, the method 500 may include generating 520 a trained policy. For example, the method may include receiving, while the vehicle is traversing the vehicle transportation network, operational environment data that includes data associated with an object external to the vehicle. The method may include determining, based at least in part on the data associated with the object, a final belief associated with an undesired outcome; constructing a backward Monte Carlo tree search model based on the final belief; determining, based on the backward Monte Carlo tree search model, a set of initial beliefs corresponding to a likelihood of leading to the final belief within a timestep threshold; and generating a trained policy by training, using the set of initial beliefs, a policy that maps a respective belief for the object within the distinct vehicle operation scenario to a respective candidate vehicle control action.

The method 500 includes receiving 530 candidate vehicle control actions. The vehicle control actions may be generated in view of the multi-objective policy for the scenario-specific operational control evaluation model instance. The received candidate vehicle controls action may be associated with each of the two objectives. In some examples, the vehicle control actions may be refined to narrow the available vehicle control actions for selection.

The method 500 includes selecting 540 a vehicle control action. The selected vehicle control action may be based on the multi-objective policy. In particular, the selected vehicle control action may be based on the relationship(s) between the objectives of the multi-objective policy, such as the priority of the first objective relative to the second objective. Selecting 540 a vehicle control action may include selecting 540 more than one control action to be performed substantially simultaneously. Selecting 540 a vehicle control action may include selecting 540 a sequence of control actions for a defined period of time.

Figure 6:
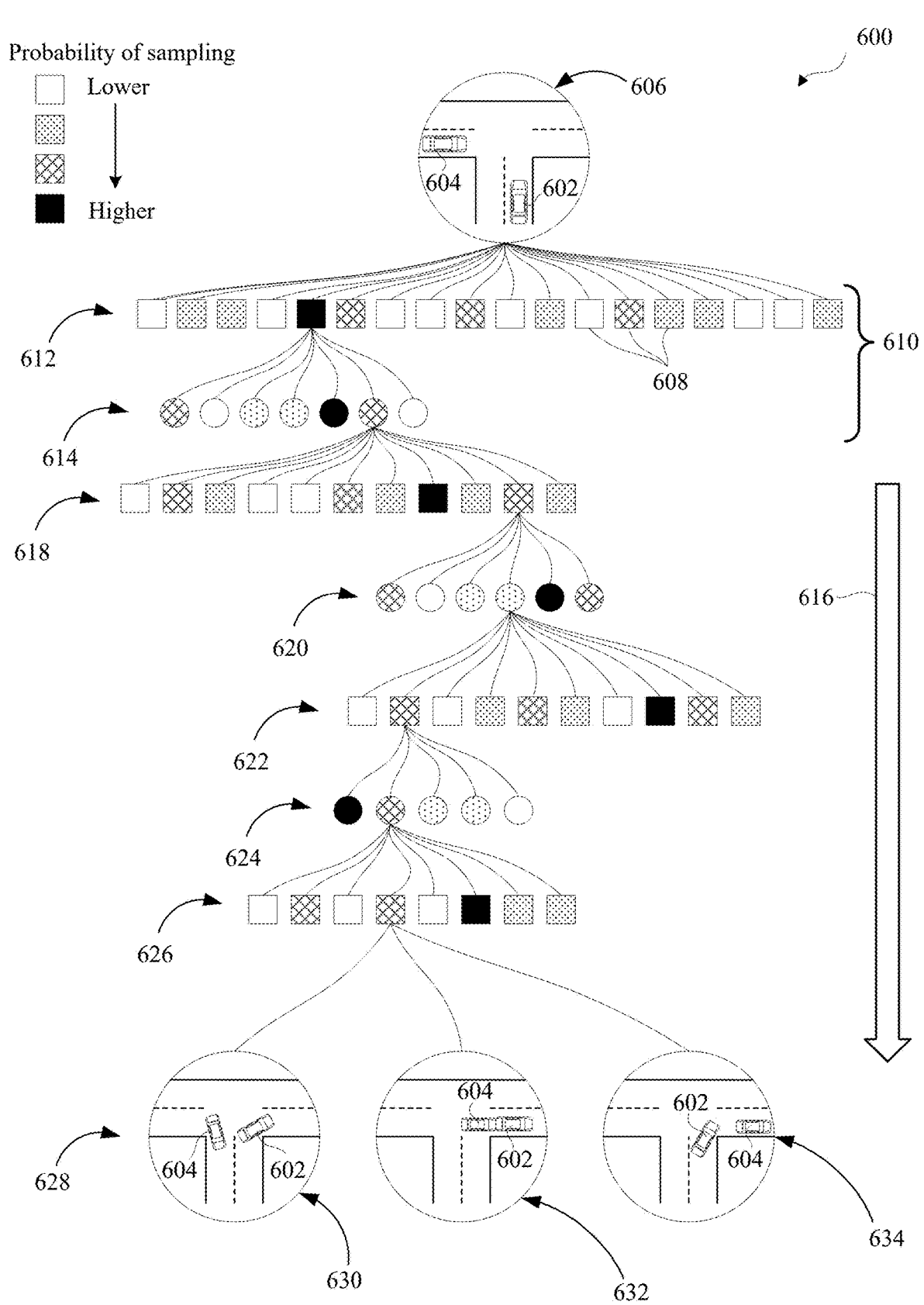
FIG. 6 is a schematic diagram depicting an example of a Monte Carlo tree search associated with an ego vehicle approaching an intersection that another road user also is approaching.

Examples of receiving 530 candidate vehicle control actions and selecting 540 a vehicle control action are described below beginning with FIG. 6. In a simple example, one objective may be based on maximizing a behavior preference and another objective may be based on minimizing a time to complete a vehicle control action (e.g., to resolve the instance). If a behavior preference is indicated as a priority over time, a candidate vehicle control action associated with the behavior preference may be selected that potentially increases the amount of time to resolve the instance, such as to turn a corner, pass another vehicle, reach the other side of an intersection, etc.

The method 500 includes traversing 550 a portion of the vehicle transportation network in accordance with the selected vehicle control action. Certain possible vehicle control actions are described above with regards to the AVOMC 310. In the following examples, vehicle control actions for an intersection may include stop, edge, or go (proceed). A stop vehicle control action may cause the vehicle to remain stationary or decelerate to a stationary position. An edge vehicle control action may cause the vehicle to incrementally approach the intersection to obtain a better view of the intersection. A go or proceed vehicle control action (i.e., when the vehicle is stationary) may cause the vehicle to accelerate and traverse the intersection.

In partially observable settings, a system infers the state of the environment indirectly through observations. Based on these observations, the agent (e.g., the system) maintains a belief over the state of the world, which is used to generate actions through a policy to achieve its goal. As explained above, such sequential decision-making problem can be systematically framed as a partially observable Markov decision process (POMDP). For the safety validation of such systems, in accordance with some implementations, the system may quantify a set of beliefs for which the system's policy has a non-negligible probability of transitioning to an unsafe state within a certain number of timesteps. Determining this set of beliefs may be used to retrain the policy specifically for those beliefs. Furthermore, such a component in a real-time safety-critical system may be used to warn the users to briefly override the policy and engage in manual control if found in such a belief. The lack of full observability makes it difficult to perform such a safety analysis. Techniques used for policy validation in MDP settings cannot be directly applied to POMDPs for the following three reasons: (1) the lack of complete observability introduces significant computational complexity in decision-making, (2) the belief space in POMDPs can be continuous and very large, making it computationally challenging to scale to high-dimension state spaces, and (3) value functions and policies for POMDPs need to be functions of beliefs rather than the actual states, leading to increased complexity in value function approximations and policy optimizations.

To address these challenges, aspects of the present disclosure provide a backward Monte Carlo tree search method. Monte Carlo tree search methods are used in partially observable settings due to their scalability and efficiency in branching. FIG. 6 is a schematic diagram depicting an example 600 of a Monte Carlo tree search associated with an ego vehicle 602 (e.g., the vehicle at which the method 600 is performed) approaching an intersection that another road user, here a vehicle 604, also is approaching. Other examples of a road user include a pedestrian, a motorcycle, a bicycle, etc. The example 600 may be implemented in an autonomous vehicle, such as the vehicle 100 shown in FIG. 1, one of the vehicles 210/211 shown in FIG. 2, a semi-autonomous vehicle, or any other vehicle implementing autonomous driving. For example, an autonomous vehicle may implement the example 600 using an autonomous vehicle operational management system, such as the autonomous vehicle operational management system 300 shown in FIG. 3. In some implementations described herein, the example 600 may be implemented in a remote assistance or support center, such as by a control center incorporating the communication device 240.

The ego vehicle 602 would like to make a right turn at the intersection when the other vehicle 604 is present. As shown in FIG. 6, a Monte Carlo tree search may start from a single root node 606 representing an initial belief. The Monte Carlo tree search branches forward in time, from top to bottom, into multiple leaf nodes 608 to simulate transitions of the system across multiple timesteps. At each layer 610, a set 612 of actions and a set 614 of observations are sampled with respect to a policy. The tree expands, from layer to layer, in the direction indicated by the arrow 616. That is, for example, the set 612 of actions may correspond to a first timestep. The set 614 of observations follow from the set 612 of actions. A set 618 of actions may correspond to a second timestep, and a set 620 of observations may follow the set 618 of actions. A set 622 of actions may correspond to a third timestep, and a set 624 of observations may follow the set 622 of actions. A set 626 of actions may correspond to a fourth timestep, and a set 628 of observations may follow the set 626 of actions. The set 628 of observations may be referred to as a set of possible final beliefs 630, 632, 634. As shown, a possible final belief 632 may include an undesired outcome (e.g., a collision of the ego vehicle 602 and the other vehicle 604).

One drawback of a forward search is the unlikelihood of reaching a low probability phenomenon of interest, such as a collision. This can make it difficult to verify and/or quantify metrics such as collision probability while the vehicle is in motion. To mitigate this drawback, implementations of the subject matter herein describe a backward Monte Carlo tree search method that facilitates detecting beliefs that have a non-negligible probability of arriving at an undesired final state or belief of interest at any instance, given the underlying policy of the agent. By doing so, real-time safety can be enhanced by approximating a lower bound of the probability of occurrence of the undesired final state or belief of interest given any belief in real time.

Figure 7:
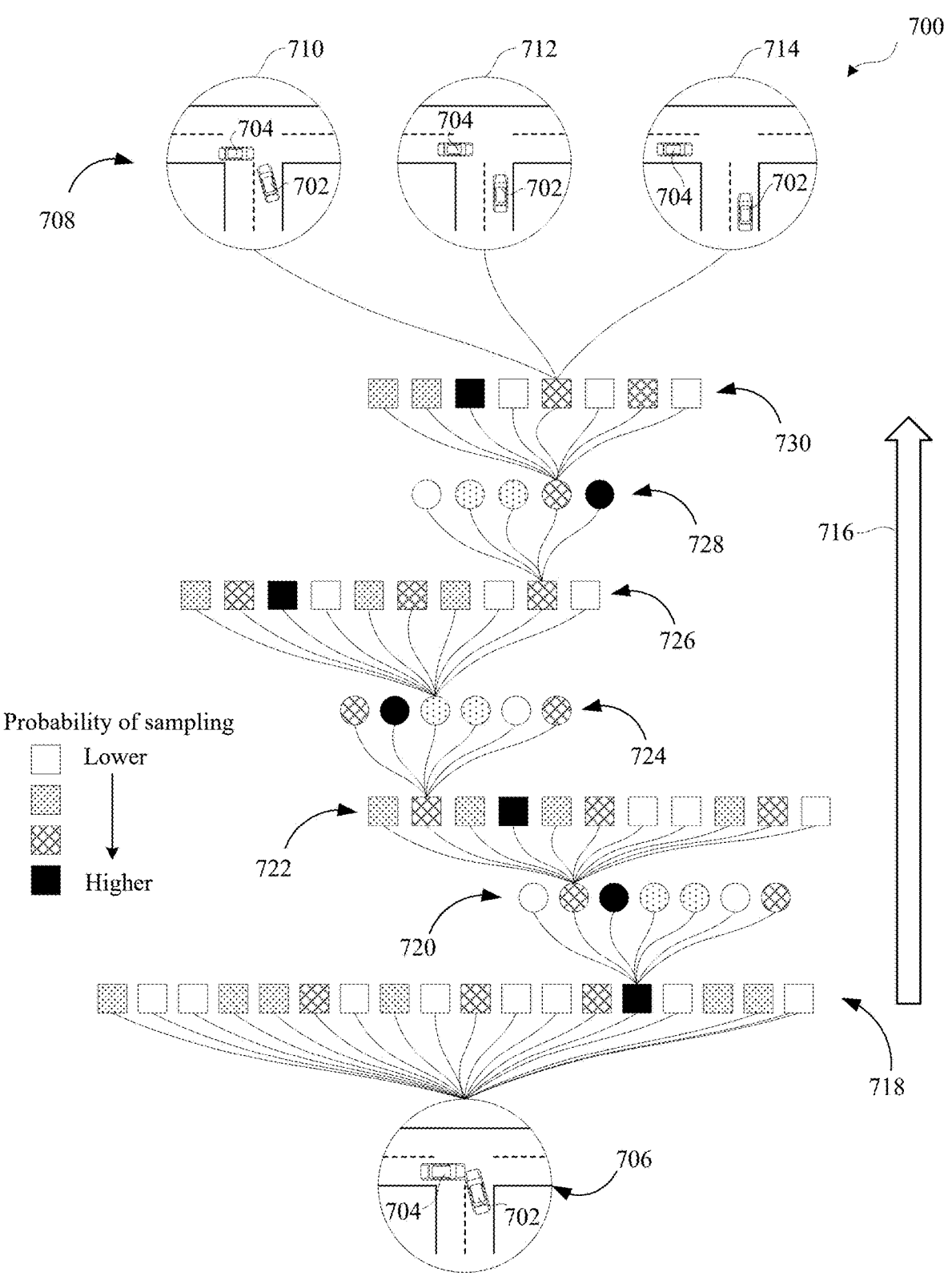
FIG. 7 is a schematic drawing depicting an example of a backward Monte Carlo tree search (BMCTS) associated with an ego vehicle approaching an intersection that another road user also is approaching.

FIG. 7 is a schematic drawing depicting an example 700 of a backward Monte Carlo tree search associated with an ego vehicle 702 (e.g., the vehicle at which the method 700 is performed) approaching an intersection that another road user, here a vehicle 704, also is approaching. The example 700 may be implemented in an autonomous vehicle, such as the vehicle 100 shown in FIG. 1, one of the vehicles 210/211 shown in FIG. 2, a semi-autonomous vehicle, or any other vehicle implementing autonomous driving. For example, an autonomous vehicle may implement the example 700 using an autonomous vehicle operational management system, such as the autonomous vehicle operational management system 300 shown in FIG. 3. In some implementations described herein, the example 700 may be implemented in a remote assistance or support center, such as by a control center incorporating the communication device 240.

The example 700 includes constructing a tree backward in time, including branching from a single leaf node 706 to a set 708 of multiple root nodes 710, 712, and 714 for the desired number of timesteps. The tree is constructed beginning with the leaf node 706 and progressing in the direction shown by the arrow 716 to the set 708 of root nodes 710, 712, and 714, which is the reverse of the Monte Carlo forward search previously described. In the backward tree, the agent may constrain its focus to a single final state or belief, represented by the leaf node 706, and branch backward in time for a desired depth. This approach ensures that the preceding branches of the tree are systematically conditioned to lead to the targeted final leaf node 706. The constructed tree yields a set of likely beliefs (represented by the 708 of root nodes 710, 712, and 714) that reach the undesired final belief (represented by the final leaf node 706) within the specified number of timesteps (four timesteps in this example 700).

In some implementations, the construction of a backward tree may be guided by a linear programming formulation to output a set of beliefs that eventually transition to an undesired state, given the policy of the agent. For example, at a first timestep, a set of actions (represented by a set 718 of leaf nodes) may be sampled, and a corresponding set of possible past observations (represented by a set 720 of leaf nodes) may be sampled. At a second timestep, a set of actions (represented by a set 722 of leaf nodes) may be sampled, and a corresponding set of possible past observations (represented by a set 724 of leaf nodes) may be sampled. At a third timestep, a set of actions (represented by a set 726 of leaf nodes) may be sampled, and a corresponding set of possible past observations (represented by a set 728 of leaf nodes) may be sampled. At a fourth timestep, a set of actions (represented by a set 730 of leaf nodes) may be sampled, and a corresponding set of possible past observations (represented by the set 708 of leaf nodes) may be sampled.

Figure 8B:
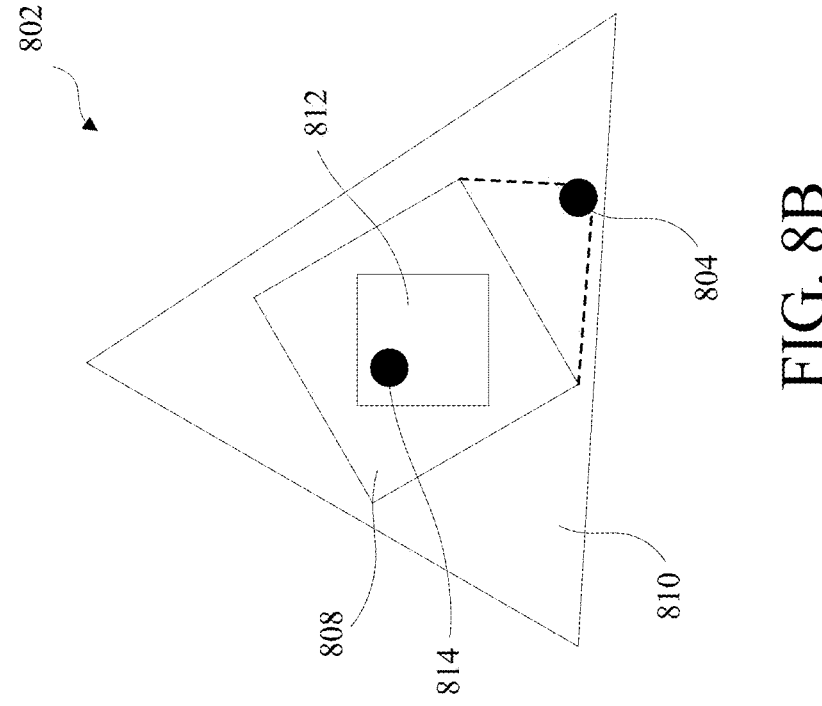
FIG. 8B is a schematic drawing depicting an example of a convex polygon from which an agent may sample.
Figure 8A:
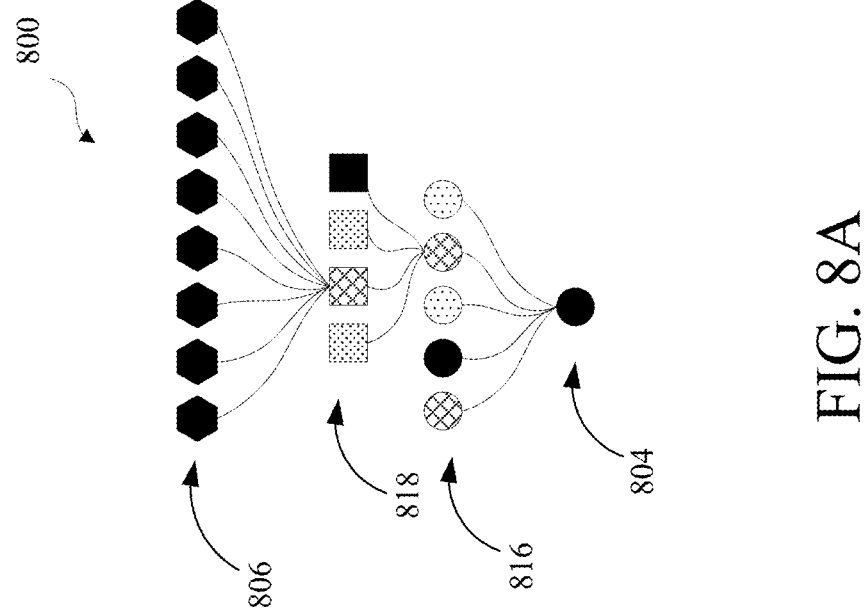
FIG. 8A is a schematic drawing depicting an example of a BMCTS.

FIG. 8A is a schematic drawing depicting an example 800 of a backward Monte Carlo tree search. To find previous beliefs, the computations may yield a face of a convex polygon from which the agent may sample. FIG. 8B is a schematic drawing depicting an example 802 of a convex polygon from which the agent may sample. The computed polygon may be a subspace of, and may have a significantly smaller dimension than, the entire belief space. Weighted sampling techniques may be used to capture belief samples that efficiently span the belief subspace of interest. The examples 800 and 802 may be implemented in an autonomous vehicle, such as the vehicle 100 shown in FIG. 1, one of the vehicles 210/211 shown in FIG. 2, a semi-autonomous vehicle, or any other vehicle implementing autonomous driving. For example, an autonomous vehicle may implement the examples 800 and 802 using an autonomous vehicle operational management system, such as the autonomous vehicle operational management system 300 shown in FIG. 3. In some implementations described herein, the examples 800 and 802 may be implemented in a remote assistance or support center, such as by a control center incorporating the communication device 240.

For example, an agent (e.g., autonomous vehicle operational management system) may take an action of a set of actions ($a \in \mathcal{A}$) from a state of a set of states ($s \in \mathcal{S}$) and transition to the next state of the set of states ($s' \in \mathcal{S}$) according to the probabilistic transition function T(s'|s, a)=P(s'|s, a), which models the environment dynamics. From the next state s', the agent obtains an observation of a set of observations ($o \in \mathcal{O}$) according to the observation function Z(o|s')=P(o|s') and receives a reward according to the reward function R(s,a). Because the agent does not have access to the true world states, the agent maintains a belief b(s), which is a vector representation of a discrete distribution over states. A discount factor $\gamma \in [0,1)$ may also be used to prioritize earning rewards sooner than later.

After an action a is taken and an observation o is received, the belief is updated to $$b'_{(b,a,o)}$$

using the following Bayesian relation:

$$b'_{(b,a,o)}(s) = b'(s) \triangleq P(s' \mid b, a, o) = \sum_s P(s' \mid s, b, a, o)P(s \mid b, a, o) = \quad (1)$$

$$\sum_s \frac{P(o \mid s', s, b, a)P(s' \mid s, b, a)}{P(o \mid s, b, a)} P(s \mid b, a, o) =$$

$$\sum_s \frac{P(o \mid s')P(s' \mid s, a)}{P(o \mid s, b, a)} P(s \mid b) \propto Z(o \mid s') \sum_s T(s' \mid s, a)b(s).$$

An alpha vector $\alpha_\pi$ is a vector representation of the expected utility when plan $\pi$ is followed from different states. The optimal policy of the agent for a given belief is computed using:

$$\pi * (b) = \arg\max_{\pi:\alpha_\pi \in \Gamma} \alpha_\pi^T b \quad (2)$$

where $\Gamma$ is a set of alpha vectors, each annotated with different actions.

The $\alpha$-vectors that belong to the set $\Gamma$ of a POMDP agent can be computed through various methods. In some implementations, $\alpha$-vectors may be used to describe an agent's policy because they operate strictly under beliefs and/or have a direct mapping from a belief to an action. Surrogate models, constructed to mimic real-world dynamics in a cost-efficient way, usually accompany discrepancies from the actual system/environment behavior. Therefore, working with beliefs can increase the overall robustness to these modeling errors.

To facilitate autonomous driving, the agent may extract a subset from the entire belief-space such that, given a specific final belief $b_\tau$, any initial belief $b_0$ from this subset will reach the final belief $b_\tau$ within $\tau$ timesteps through a specific sequence of actions and observations $(a_0, o_0, a_1, o_1, \ldots)$. An undesired final belief $b_\tau$ may be, for the purpose of generating the backward Monte Carlo tree, a fully observable single state. This is a reasonable assumption as, for most autonomous robotics applications, an undesired state such as the ego vehicle crashing is robustly detectable. Forward sampling-based methods can encounter difficulties in assessing whether a particular root node is close to a specific leaf belief. This limitation arises because, as the number of timesteps increases, the multiplication of probabilities across each timestep diminishes exponentially, approaching infinitesimal values. Consequently, the likelihood of the agent's sampled trajectory leading to the final belief $b_\tau$ of interest becomes low, rendering it practically infeasible.

To mitigate such issues, as described above, a tree is constructed from the sampled beliefs backward in time. The agent may assign weight to each branch using the respective forward probabilities. The tree may be constructed by carrying out these steps for $\tau$ layers to sample beliefs from a belief set with a non-negligible probability of reaching a specific belief after $\tau$ timesteps. The construction of a backward Monte Carlo tree search, as the name suggests, may be executed backward in time. At any level of the tree, the tree aims to branch from a belief $b_t$ 804 at time t, to a set 806 of possible previous possible beliefs $\{b_{t-1}\}$ at time t−1. For example, as shown in FIG. 8B, for a belief $b_t$ 804 at time t, the agent may identify a subspace 808 from the entire belief space $\mathcal{B}$ 810 where the set 806 of possible previous possible beliefs $\{b_{t-1}\}$ at time t−1 can reside. This operation may be denoted as $T^{-1}(b_t; a_{t-1}, o_t,)$ where it may be assumed that the action taken at t−1 and the observations received at/are known. The operation $T^{-1}((b_t; a_{t-1}, o_t,)$ may result in a convex polytope (shown by the subspace 808), from which the agent can sample beliefs. However, some of the beliefs in the set of possible previous possible beliefs $T^{-1}$ ($b_t$) have a low likelihood of actually reaching the belief $b_t$. Therefore, the agent may further narrow the subspace of interest to a smaller polytope $$T_z^{-1}(b_t; a_{t-1}, o_t,)$$

(shown by subspace 812), whose beliefs have a reachability probability to the belief $b_t$ above a threshold. This threshold may be characterized by a hyperparameter z explained in further detail below.

The agent may sample previous beliefs $$b_{t-1} \sim T_z^{-1}(b_t)$$

814. The backward tree construction starts from the leaf node for the belief $b_t$ 804. Possible observations (shown as a set 816 of circular observation nodes 816) that might have been received at time t−1 are sampled. Next, the agent may sample actions (shown as a set 818 of rectangular nodes) that the agent might have taken, that would lead to the succeeding observation and belief node. For any path $(a_{t-1}, o_t)$, the agent can then sample the set 806 of previous beliefs (shown as the set 806 of hexagon nodes)

$$b_{t-1} \sim T_z^{-1}(b_t; a_{t-1}, o_t),$$

which can be solved using a linear program that yields the optimal vertices of this polytope because the problem is convex. The recurrence in FIG. 8B may be repeated, starting from every sampled previous belief $b_{t-1}$, thereby finding possible beliefs $b_{t-2}$. There may be a single bottom-most leaf node 804 in the entire backward tree, which may represent the undesired final state or belief that the agent wishes to avoid. The tree may be constructed for a desired depth. While the tree is constructed, it may be assumed that the Luce Choice Axiom holds. That is, every (action, observation) pair may be logically distinct and may lead to distinct beliefs. Otherwise, equivalent (a, o) pairs may lead to $|\mathcal{A}|^\tau$ possible paths that are equivalent, each of them having a negligibly small probability of occurring.

Figure 9:
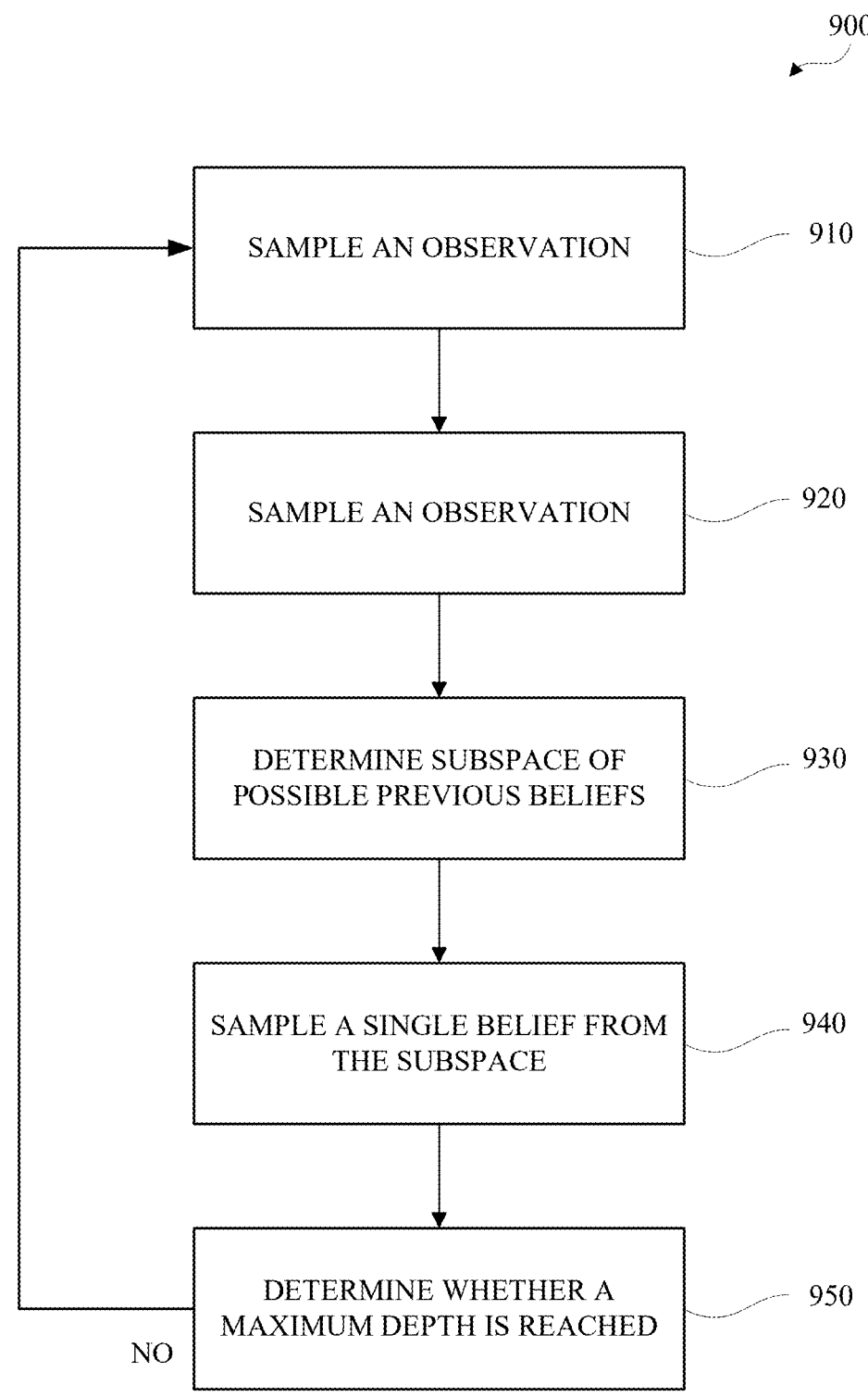
FIG. 9 is a flow diagram depicting an example method for construction of a BMCTS model.

FIG. 9 is a flow diagram depicting an example method 900 for construction of a backward Monte Carlo tree. The method 900 may be implemented in an autonomous vehicle, such as the vehicle 100 shown in FIG. 1, one of the vehicles 210/211 shown in FIG. 2, a semi-autonomous vehicle, or any other vehicle implementing autonomous driving. For example, an autonomous vehicle may implement the method 900 using an autonomous vehicle operational management system, such as the autonomous vehicle operational management system 300 shown in FIG. 3. In some implementations described herein, the method 900 may be implemented in a remote assistance or support center, such as by a control center incorporating the communication device 240.

The method 900 may be implemented as an algorithm such as, for example, Algorithm 1:

```
while max depth is not reached do
    Sample an observation
    Sample an action
    Find subspace of possible previous beliefs
    Sample a single belief from this subspace
end while.
```

Similarly, as shown in FIG. 9, the method 900 includes, at operation 910, sampling an observation. Sampling the observation may include sampling observation nodes independently for each belief node. For example, for the given next belief $b_t$, the observations in the previous timestep may be observed from the states with non-zero entries in the next belief $b_t$. The agent may define the entries of the next belief $b_t$ as $$\{P(s_1'), P(s_2'), \dots\},$$

which are provability values, and hence $$0 \le P(s_k') \le 1, \forall k$$

and $$\sum_k P(s_k') = 1.$$

The agent may compute the probability of each observation as $$P(o) = \sum_k Z(o \mid s_k')P(s_k') \forall o \in O,$$

which may be easily vectorized. During construction of the tree, the agent may sample observations nodes preceding the belief $b_t$ with respect to their probabilities $P(o)$.

At operation 920, an action is sampled. Sampling an action may include sampling one or more available actions. There are variations of the Monte Carlo tree search algorithm to effectively manage large state, action, and observation spaces. For example, instead of expanding all available actions, action branches can be progressively widened. In a backward Monte Carlo tree search, the agent may employ an approach similar to upper confidence trees (UCT) during action branching. A breadth-first search may provide broad coverage, as it does not include a directed search, whereas a depth-first search does include a directed search and may have better memory properties despite a potential downside of not propagating information gain in the opposite direction. A UCT search is designed to balance both approaches. In some implementations, the agent may incorporate the following allocation strategy:

$$P(a \mid oh) = Q(aoh) + k_{ucb}\sqrt{\frac{\log N(oh)}{N(aoh)}}, \tag{3}$$

where o is a sampled observation, Q(h) is the expected terminal Bayesian probability of an action-observation history h, and N(h) counts the number of times h has been visited in the tree. Here, the expression aoh refers to history h expanded backward in time, with action a and observation o preceding the action (i.e., after action a is taken and observation o is received, history h occurs). Similarly, oh refers to history h expanded backward in time, with observation o preceding it, and is not attached to any specific action. The scalar hyperparameter $k_{ucb}$ balances exploration and exploitation.

Once the tree is branched using a sampled observation and with the action that solves the equation above associated with the UCB1 strategy, the previous belief nodes may be computed using a linear program formulation.

At operation 930, the method 900 includes determining a subspace of possible previous beliefs. Given the sampled observation and selected action, the agent may compute previous beliefs ($b_{t-1}$ nodes) using a linear program formulation. The agent may be provided with, for example, the belief $b_t$ at timestep t and agent policy represented by $\Gamma$ containing $\alpha$-vectors $\alpha_1, \dots, \alpha_{|\Gamma|}$. For a sampled observation $o_i$ and selected action $a^j$ corresponding to the $\alpha$-vector $\alpha_j \in \Gamma$, the agent may formulate the linear program as follows:

$$\min_{x,u} 1^T u \tag{4}$$

$$\text{s.t.} \quad \alpha_j x \ge \alpha_k x \; \forall \; \alpha_k \in \Gamma \tag{5}$$

$$x^k = 0 \; \forall \; col^k\left(\overline{O}_{o_i} \overline{T}_{a_j}\right) = 0 \tag{6}$$

$$x \ge 0 \tag{7}$$

$$1^T \overline{O}_{o_i} \overline{T}_{a_j} x = 1 \tag{8}$$

$$\left(\hat{O}_{o_i} \overline{T}_{a_j} - z1^T\right) x \ge 0 \tag{9}$$

$$b_t - \overline{O}_{o_i} \overline{T}_{a_j} x \le u \tag{10}$$

$$b_t - \overline{O}_{o_i} \overline{T}_{a_j} x \ge -u \tag{11}$$

where $$\overline{O}_{o_i} = \begin{bmatrix} Z\left(o_i \mid s_1'\right) & & \\ & \ddots & \\ & & Z\left(o_i \mid s_N'\right) \end{bmatrix} \tag{12}$$

$$\overline{T}_{a_j} = \begin{bmatrix} T\left(s_1' \mid s_1, a^j\right) & \dots & T\left(s_1' \mid s_N, a^j\right) \\ \vdots & \vdots & \vdots \\ T\left(s_N' \mid s_1, a^j\right) & \dots & T\left(s_N' \mid s_N, a^j\right) \end{bmatrix} \tag{13}$$

$$\hat{O}_{o_i} = [Z(o_i \mid s_1') \; \dots \; Z(o_i \mid s_N')] \tag{14}$$

$$\equiv \text{diag}(\overline{O}_{o_i}) \tag{15}$$

and z is a hyperparameter whose value can be chosen (e.g., using a technique described herein). Here, $x^k$ denotes the k-th element of x, and $col^k(\cdot)$ denotes the k-th column of $(\cdot)$.

To formulate a linear program through equations (4)-(15), the agent may denote $$b_{t-1}^{ij}$$

as the previous belief to the belief $b_t$ before taking action $a^j$ and receiving observation $o_i$. Given that the agent has received observation $o_i$ after taking an action at time t−1, the agent can construct the diagonal observations matrix as follows:

$$\overline{O}_{o_i} = \begin{bmatrix} z\left(o_i \big| s_1'\right) & & \\ & \ddots & \\ & & z\left(o_i \big| s_N'\right) \end{bmatrix} \tag{16}$$

where $$s_1', \dots, s_N'$$

represent the next states the agent could have transitioned to at time t. The off-diagonal elements in the matrix (16) above are zeros. Given that an agent has taken the action $a^j$ corresponding to the alpha-vector $\alpha_j \in \Gamma$, the agent can construct the following square transition matrix:

$$\overline{T}_{\alpha_j} = \begin{bmatrix} T\left(s_1' \mid s_1, a^j\right) & \dots & T\left(s_1' \mid s_N, a^j\right) \\ \vdots & \vdots & \vdots \\ T\left(s_N' \mid s_1, a^j\right) & \dots & T\left(s_N' \mid s_N, a^j\right) \end{bmatrix}. \tag{17}$$

It can be seen that, if the previous belief $$b_{t-1}^{ij}$$

was known, the updated belief $b_t$ could have been computed using:

$$b_t = \eta \overline{O}_{o_i} \overline{T}_{\alpha_j} b_{t-1}^{ij} \propto \overline{O}_{o_i} \overline{T}_{\alpha_j} b_{t-1}^{ij} \tag{18}$$

where $\eta$ is a normalization constant. Equation (18) is the matrix form of Equation (1).

To work in the converse direction, assuming that the agent knows the belief $b_t$ at timestep t, and the observation that the agent has received was $o_i$ after having taken action $a^j$ associated with $\alpha_j$, the agent would like to find the belief $b_{t-1}$ of the previous timestep t−1. The agent may define the following objective function to formalize this problem as:

$$\min_{x,y} \left\| y b_t - \overline{O}_{o_i} \overline{T}_{\alpha_j} x \right\|_1 \tag{19}$$

where the agent defines vector x to be the estimate of $$b_{t-1}^{ij}$$

and the scalar y to be the inverse of the normalization constant $\eta$ as used in Equation (18). Thus, Equation (18) may be rewritten as:

$$y = 1^\top \overline{O}_{o_i} \overline{T}_{\alpha_j} x. \tag{20}$$

Using an L1 norm forces the optimal solution of the problem to lie on a convex polygon and guarantees at least one optimal solution as long as the problem is not over-constrained. The expression inside the norm in equation (20) being zero would imply an exact belief update from x to $b_t$ if observation $o_i$ is received when the action of $\alpha_j$ is taken, which is what is desired.

Because the belief should be a valid probability distribution of states, and the elements should sum to 1, the following constraints exist:

$$1^\top x = 1 \tag{21}$$

$$1 \ge x \ge 0 \,\forall\, x \in x$$

where 0 denotes the appropriately sized vector of zeros. Furthermore, to prevent division by zero during belief update normalization, the agent may force y>0. This can be equivalently represented as:

$$y \ge \epsilon \tag{22}$$

where $\epsilon$ is a very small positive number. Because it can be assumed that the agent's policy $\Gamma$ (consisting of $\alpha$-vectors) is known, the selected action for any potential belief x would be the one with the highest utility and can be expressed using the following set of constraints:

$$\alpha_j x \ge \alpha_k x \,\forall\, \alpha_k \in \Gamma. \tag{23}$$

Finally, the belief x should not lie in the nullspace of the square matrix $\overline{O}_{o_i} \overline{T}_{\alpha_j}$:

$$x \notin \mathrm{null}\left(\overline{O}_{o_i} \overline{T}_{\alpha_j}\right). \tag{24}$$

If this constraint is not added, the optimizer can arbitrarily set the elements of the belief x such that the objective function in Equation (19) can be driven to zero without a meaningful solution. One can equivalently express the nullspace constraint as the following set of equality constraints:

$$x^k = 0 \,\forall\, col^k\left(\overline{O}_{o_i} \overline{T}_{\alpha_j}\right) = 0 \tag{25}$$

where $x^k$ denotes the k-th element of x, and $col^k(\bullet)$ denotes the k-th column of $(\bullet)$. Combining all the derivations above, the entire problem can be formulated as the following linear program (LP):

$$\min_{x,y} \left\| y b_t - \overline{O}_{o_i} \overline{T}_{\alpha_j} x \right\|_1 \tag{26}$$

s.t. *Eqs.* (23), (25), (20), (21), and (22).

However, when there are multiple solutions to the LP described in equation (26), which is often the case, then the scaling of the objective value due to y causes missing out on some of the optimal vertices. To understand why this might happen, one can think of two optimal vertices $x_1$ and $x_2$ in equation (26). Despite the fact that both $x_1$ and $x_2$ are valid probability distributions (both satisfy equation (21)), the values of $\overline{O}_{o_i}T_{\alpha_j}x_1$ and $\overline{O}_{o_i}T_{\alpha_j}x_2$ could be on different scales (if $y_1 \neq y_2$ for solutions $(x_1, y_1)$ and $(x_2, y_2)$). In other words, it would be observed that $$\frac{\overline{O}_{o_i}T_{\alpha_j}x_1}{y_1} = \frac{\overline{O}_{o_i}T_{\alpha_j}x_2}{y_2},$$

but $y_1 b_t - \overline{O}_{o_i}T_{\alpha_j}x_1 \neq y_2 b_t - \overline{O}_{o_i}T_{\alpha_j}x_2$. Therefore, one of these solutions would be missed. To remedy the failure to identify some of the optimal vertices, the following modifications may be made:

$$1 \geq x \geq 0 \longrightarrow x \geq 0 \tag{27}$$

$$1^\top x = 1 \longrightarrow \text{removed}$$

$$y \geq \epsilon \longrightarrow y \triangleq 1$$

and combining equations (20) and (21) yields:

$$1^\top \overline{O}_{o_i}T_{\alpha_j}x = 1 \tag{28}$$

that simply forces the updated belief to be a valid probability distribution. Accordingly, the new LP formulation becomes the following:

$$\min_x \left\| \, b_t - \overline{O}_{o_i}T_{\alpha_j}x \right\|_1 \tag{29}$$

s.t. *Eqs.* (23), (25), (27), and (28)

where the estimate of $$b_{t-1}^{ij}$$

is now $$\frac{x}{1^\top x}$$

instead of just x.

Although the objective function in equation (29) is correct for all optimal vertices to the LP, one drawback of this formulation is that the returned vertices often have a small reachability probability. In other words, the probability of transitioning from the estimated belief $$b_{t-1} \approx \frac{x}{1^\top x}.$$

to estimated belief $b_t$ occasionally ends up being very small, thereby causing the BMCTS to explore unlikely regions of the belief-space. To remedy this, an additional constraint may be added to the LP formulation in equation (29) as follows:

$$P(o_i|a^j, x) = \sum_s \sum_{s'} Z(o_i|s')T(s'|a^j, s)\frac{x^s}{1^\top x} \geq z \tag{30}$$

where $x^s$ denotes the element of x corresponding to state s, and $1 > z > 0$ is a dynamically set hyperparameter.

If hyperparameter $z=0$ were allowed, this would imply a solution x that has zero probability of reaching belief $b_t$, which is not of interest to the agent. Having $z=1$ would require full observability, which is not the case for a POMDP. Accordingly, this over-constrains the problem. Keeping the value of the hyperparameter z relatively high allows the overall paths in the tree to have reasonably high probabilities. Additionally, the constraint above can be rewritten:

$$\frac{\hat{O}_{o_i}T_{\alpha_j}x}{1^\top x} \geq z \tag{31}$$

where $$\hat{O}_{o_i} = \left[ Z(o_i|s_1') \cdots Z(o_i|s_N') \right] \equiv \text{diag}(\overline{O}_{o_i}). \tag{32}$$

The denominator in Equation (31) can be dropped by re-framing the same expression as follows:

$$(\hat{O}_{o_i}T_{\alpha_j} - z1^\top)x \geq 0. \tag{33}$$

This provides the linear program:

$$\min_x \left\| b_t - \overline{O}_{o_i}T_{\alpha_j}x \right\|_1 \tag{34}$$

s.t. *Eqs.* (23), (25), (27), (28), and (33)

where the estimate $$b_{t-1}^{ij}$$

is again $$\frac{x}{1^\top x}.$$

Finally, the agent may convert the objective function of equation (34) containing an L1 norm to an entirely linear relation by defining the following two new sets of constraints:

$$b_t - \overline{O}_{o_i}T_{\alpha_j}x \leq u \tag{35}$$

$$b_t - \overline{O}_{o_i}T_{\alpha_j}x \geq -u$$

where the vector u is a slack variable. Correspondingly, the objective function of the LP can now be written $\min_{x,u}1^\top u$. Along with constraints Equations (35), this new objective function is equivalent to the one in Equation (34), but now has a linear relation. Hence, the conclusive definition of the linear program, for a given observation $o_i$ and the action $a^j$ corresponding to the alpha-vector $\alpha_j \in \Gamma$, is as follows, as indicated above:

$$\min_{x,u} 1^\top u \tag{4}$$

$$\text{s.t. } \alpha_j x \geq \alpha_k x \ \forall \ \alpha_k \in \Gamma \tag{5}$$

$$x^k = 0 \ \forall \ col^k\big(\overline{O}_{o_i} \overline{T}_{\alpha_j}\big) = 0 \tag{6}$$

$$x \geq 0 \tag{7}$$

$$1^\top \overline{O}_{o_i} \overline{T}_{\alpha_j} x = 1 \tag{8}$$

$$\big(\hat{O}_{o_i} \overline{T}_{\alpha_j} - z1^\top\big)x \geq 0 \tag{9}$$

$$b_t - \overline{O}_{o_i} \overline{T}_{\alpha_j} x \leq u \tag{10}$$

$$b_t - \overline{O}_{o_i} \overline{T}_{\alpha_j} x \geq -u \tag{11}$$

where the agent computes the previous $$b_{t-1}^{ij}$$

at time t−1, given the belief $b_t$ at time t, as $$\frac{x}{1^\top x}.$$

It can be shown that, for a suitable value of $k_{ucb}$, the Q-values constructed by BMCTS converge to their optimal value, i.e., $$Q(h) \xrightarrow{P} Q_*(h),$$

when all h branch out from the same (leaf) node. The bias of the Q-value function $$\mathbb{E}[Q(h) - Q_*(h)]$$

becomes $O(\log N(h)/N(h))$ as $N(h) \to \infty$.

The constraint in equation (9) requires choosing the value of hyperparameter z, which may not be intuitive depending on the problem. Higher z values will enforce solutions $b_{t-1}$ $$\left(\text{i.e., } \frac{x}{1^x x}\right)$$

to equation (4) having a higher probability of reaching belief $b_t$. Nonetheless, selecting z too high may render the linear program of equation (4) infeasible because transition and observation dynamics of the POMDP may not allow it. To remedy this uncertainty, a sampling method can be used to pick a feasible z value. First, the agent may determine the maximum possible value of z for a given linear program. This can be achieved by solving a prior light-weight linear program that outputs $z_{max}$, the maximum possible value of z for a given observation $o_i$ and the action $a^j$ corresponding to the alpha-vector $\alpha_j \in \Gamma$ before attempting to solve equation (4). Finding $z_{max}$ can be achieved by solving the following linear program:

$$\max_{x,z} z \tag{36}$$

$$\text{s.t. } \alpha_j x \geq \alpha_k x \ \forall \ \alpha_k \in \Gamma, k \neq j \tag{37}$$

$$x^k = 0 \ \forall \ col^k\big(\overline{O}_{o_i} \overline{T}_{a_j}\big) = 0 \tag{38}$$

$$\hat{O}_{o_i} \overline{T}_{\alpha_j} x = z \tag{39}$$

$$1^T x = 1 \tag{40}$$

$$1 \geq x \geq 0 \ \forall \ x \in x \tag{41}$$

where Equation (36) is the inverse linear program of Equation (4). Here, the first two constraints (37) and (38) above are equations (5) and (6). Equation (39) enforces the probability $p(o_i|x, a^j) = z$. Equations (40) and (41) assure that x is a valid belief (e.g., x has a valid probability distribution).

Once the value of $z_{max}$ is found by solving equation (36), z can be sampled arbitrarily from the interval $(0, z_{max}]$ to solve equation (4). As described earlier, smaller values of the hyperparameter z cause BMCTS to explore unlikely regions of the belief space, whereas values on the higher end result in a concentration on beliefs resulting from the most probable transitions and observations. In some implementations, the agent may be configured to achieve a balance between the two extrema by sampling z from the following exponential distribution:

$$P(z) \propto \begin{cases} \exp(zk_{z-exp}), & \text{if } z \in (0, z_{max}] \\ 0, & \text{otherwise} \end{cases} \tag{42}$$

where $k_{z-exp}$ is a hyperparameter to tune the steepness of the exponential curve. Using an exponential curve encourages the selection of beliefs that have a higher likelihood. Therefore, the overall tree contains paths having non-diminishing probabilities.

In some implementations, LP in equation (4) can be solved by using off-the-shelf solvers such as a Gurobi Optimization or a JuMP. However, such solvers only return a single vertex (the first one found) that minimizes the given objective function. In the backward tree construction, the agent must know the entire optimal polytope, not just a single vertex that belongs to it, to allow the agent to better sample from the belief space. To do so, the agent may use pivoting to jump between vertices of the optimal polytope until they are all discovered. Pivoting can only be done when the linear program is written in its equality form $$\min_v c^T v \tag{43}$$

$$\text{s.t. } Av = d$$

$$v \geq 0$$

and, thus the agent may transform the standard LP formulation in equation (4) into an equality form. For example, to do so, N is the number of states of the POMDP formulation. Explicitly writing A, c, d requires the introduction of new slack variables. A vector of all variables v may be defined as follows:

$$v = [x \quad u \quad g \quad m \quad n \quad r]^T \tag{44}$$

where $x \in \mathbb{R}^N$ contains the values of interest, and u, m, $n \in \mathbb{R}^N$, $g \in \mathbb{R}^{|\Gamma|-1}$, and $r \in \mathbb{R}$ are slack variables that will allow the previous LP to be written in equality form. With v defined as above, the objective vector c, consisting of zeros and ones, may be written as follows:

$$c = \begin{bmatrix} 0 \in \mathbb{R}^N \\ 1 \in \mathbb{R}^N \\ 0 \in \mathbb{R}^{|\Gamma|-1} \\ 0 \in \mathbb{R}^N \\ 0 \in \mathbb{R}^N \\ 0 \in \mathbb{R} \end{bmatrix}. \tag{45}$$

where the objective $\min_v c^T v$ is identical to the one in equation (4). To formulate the constraints as $Av=d$, we define A and d as follows:

$$A = \begin{matrix} (\alpha_j - \alpha_1)^T & 0 & -I & 0 \\ \vdots & & & \\ (\alpha_j - \alpha_{k \neq j})^T & & & \\ (\alpha_j - \alpha_{|\Gamma|-1})^T & & & \\ [0 \dots 1_{Null^1} \dots 0] & & 0 & \\ [0 \dots 1_{Null^{k \in Null}} \dots 0] & & & \\ \cdot & & & \\ \cdot & & & \\ \cdot & & & \\ [0 \dots 1_{Null^{|Null|}} \dots 0] & & & \\ 1^T \bar{O}_{o_i} \bar{T}_{\alpha_j} & 0 & & \\ \hat{O}_{\alpha_j} \bar{T}_{\alpha_j} - z 1^T & 0 & -1 & \\ \bar{O}_{o_i} \bar{T}_{\alpha_j} & I & 0 & -I & 0 \\ \bar{O}_{o_i} \bar{T}_{\alpha_j} & -I & & 0 & I \end{matrix}$$

where Null denotes the set of indices k that satisfy equation (6). Matrix A may be referred to as having six "rows" corresponding to individual constraints, and six "columns" corresponding to individual variables of v. The subparts in matrix A denoted with 0 describe being filled with zeros entirely, and I is an identity matrix of an appropriate size. Rows 1 and 2 contain multiple expressions stacked vertically. Table 1 below tabulates how constraints of equation (4) have been presented as a "row" in matrix A, and $$d = \begin{bmatrix} 0 \in \mathbb{R}^{|\Gamma|-1} \\ 0 \in \mathbb{R}^{|Null|} \\ 1 \in \mathbb{R} \\ 0 \in \mathbb{R} \\ b_t \in \mathbb{R}^N \\ b_t \in \mathbb{R}^N \end{bmatrix}. \tag{46}$$

TABLE 1

| Constraint | "Row" of A |
|---|---|
| Eq. (10) | 1 |
| Eq. (11) | 2 |

TABLE 1-continued

| Constraint | "Row" of A |
|---|---|
| Eq. (13) | 3 |
| Eq. (14) | 4 |
| Eq. (15) | 5 |
| Eq. (16) | 6 |
| Eq. (12) | $v \geq 0$ |

To extract vertices from the optimal polytope, the agent may first run an off-the-shelf solver to find an initial feasible solution, using the above definitions of A, c, d. Because the problem is convex, a solution is returned in polynomial time. Then, the agent may recursively and exhaustively pivot all vertex indices that can be swapped from this initial solution. Ultimately, the agent may recover all vertices of the optimal polytope. Note that any convex combination of these vertices is still an optimal solution, and this will be the basis of the belief sampling technique described below.

At operation 940, the method 900 includes sampling a single belief from the subspace. The description above outlines how to formulate a linear program (LP) for finding previous beliefs, given the next belief and an action-observation pair (a, o). Here, action a was chosen from the UCB1 strategy after an observation o was sampled. Then, this same LP can be rewritten as an equality form. Using this equality form, when an LP has multiple solutions (i.e., solutions lie on a polytope), all the vertices can be obtained exhaustively using pivoting. Because both the objective function and the constraints are represented as linear relations, any convex combination of the extracted vertices is still an optimal solution to the LP. This knowledge may be used to sample different belief nodes in the tree and thereby create multiple branches bottom-up. The optimal vertices are $\{v_1, v_2, \dots |Av_k=d, \forall v_k\}$ to the LP that approximates the previous belief $$b_{t-1}^{ij}.$$

The agent may only be interested in the x components of these vertices (values of the slack variables are of no use, see equation (44)). Thus, a belief sample may be created by computing the convex combination $$x_{sample} = w_1 v_1^x + w_2 v_2^x + \dots \tag{47}$$

where $v^x$ represents the normalized x portion of solution v, and the weights $w_k$ are sampled from the following Dirichlet distribution:

$$(w_1, w_2, \dots) \sim Dir\left( \frac{P(o_i \mid a^j, v_1^x)}{\sigma}, \frac{P(o_i \mid a^j, v_2^x)}{\sigma}, \dots \right) \tag{48}$$

where $$\sigma \triangleq \min_k P(o_i \mid a^j, v_k^x) \tag{49}$$

$$P(o_i \mid a^j, x) = \sum_s \sum_{s'} Z(o_i \mid s') T(s' \mid a^j, s) \frac{x^s}{1^T x}. \tag{50}$$

Sampling from the distribution above satisfies $\Sigma_k w_k = 1$, and thereby guarantees that equation (47) is a convex combination. Because each term satisfies $$\frac{P\left(o_i \mid a^j, v_k^x\right)}{\sigma} \geq 1,$$

equation (48) behaves as a sampler that weighs each vertex proportionally to their reachability probability $$P\left(o_i \mid a^j, v_k^x\right).$$

At operation 950, the method 900 includes determining whether a maximum depth is reached. If so, the method 900 ends. If not, as shown by the arrow in FIG. 9, the method 900 is repeated, beginning again with sampling an observation as shown at operation 910.

The backward Monte Carlo tree search (BMCTS) approach returns a set of beliefs and their histories that contain individual sequences of actions and observations. The agent identifies, given the history of the beliefs, the probability for each of these beliefs ending up at a certain final state or belief. This value may be referred to as the belief's terminal probability, and the agent may compute it through a sequence of Bayesian operations. Given belief $b_\tau$ and its history h, the terminal Bayesian probability of this belief can be computed using the following Algorithm 2.

$$P(b', o \mid b, a) = P(b' \mid b, a, o)P(o \mid b, a) \tag{51}$$

$$= P(b' \mid b, a, o)\sum_{s'} P(o \mid b, a, s')P(s' \mid b, a)$$

$$= P(b' \mid b, a, o)\sum_{s'} P(o \mid b, a, s')$$

$$\sum_s P(s' \mid b, a, s)P(s \mid b, a)$$

$$\approx \sum_{s'} Z(o \mid s')\sum_s T(s' \mid a, s)b^s$$

where b' denotes the updated belief of b if action a was taken and observation o was received. The final expression of equation (51) becomes independent from b'. Here, an assumption may be made that $P(b'|b, a, o) \approx 1$. The final expression can also be vectorized as $$\hat{O}_o^T T_a$$

b where the definitions of $T_{a_j}$ and $\hat{O}_{o_i}$ were given in equations (13) and (14) or (15), respectively. After computing the value of P(b', o|b, a) using Branch Weight function, this value is multiplied by p to update the value of p (Line 5 in BayesianProb). Then, belief b is deterministically updated (forward in time) using the UpdateBelief function, which uses Bayes' rule with action a and observation o (Line 6 in BayesianProb). This operation is identical to equation (18). These two operations, Branch Weight and UpdateBelief, are called iteratively for all (a, o) pairs in h.

---

Algorithm 2

---

1: function BAYESIANPROB ($b_\tau$, h)
2:     p ← 1
3:     b ← $b_\tau$
4:     for (a, o) ∈ h do ▸ Loops through action-observation pairs, forward in time.
5:         p ← p × BRANCHWEIGHT(b, a, o)

6:         b ← UPDATEBELIEF(b, a, o)

7:     end for

8:     return p

9: end function
10: function BRANCHWEIGHT(b, a, o)

11:     $p \leftarrow \hat{O}_o^T \bar{T}_a b$ ▷ Approximately equal to $P(b', o|b, a)$.

12:     return p
13: end function
14: function UPDATEBELIEF(b, a, o)

15:     $b \leftarrow \overline{O}_o T_a b$ ▷ Equivalent to $b^{s'} \propto Z(o|s')\sum_s T(s'|s, a)b^s \forall s' \in \mathcal{S}$.

16:     $b \leftarrow \dfrac{b}{1^T b}$ ▷ Normalization.

17:     return b
18: end function

---

The main function of Algorithm 2 is the BayesianProb function. The agent may initialize the terminal probability value as p=1. The BayesianProb function loops through all the action-observation pairs recorded in history h. For each (a, o) pair, a BranchWeight value is computed. This value approximates the probability p=P(b', o|b, a) through the following relation:

To understand why each branch (i.e., an edge in the tree) is weighted by P(b', o|b, a), it is important to understand the cause and affect relation among beliefs, actions, and observations. For example, when the agent updates beliefs forward in time, the cause is the previous belief and the action that was taken and, as an effect, an observation is received. Using this observation, the agent updates its belief. Therefore, the cause is the previous belief b and action a, where their effect is receiving observation o and thereby updating to belief b' whose probability is represented by P(b', o|b, a). However, this probability value is valid for a single timestep update. Because the branches in the backward tree include multiple layers, the agent wishes to expand this probability computation across a sequence of belief updates.

Figures 10A, 10B, 10C, 10D:
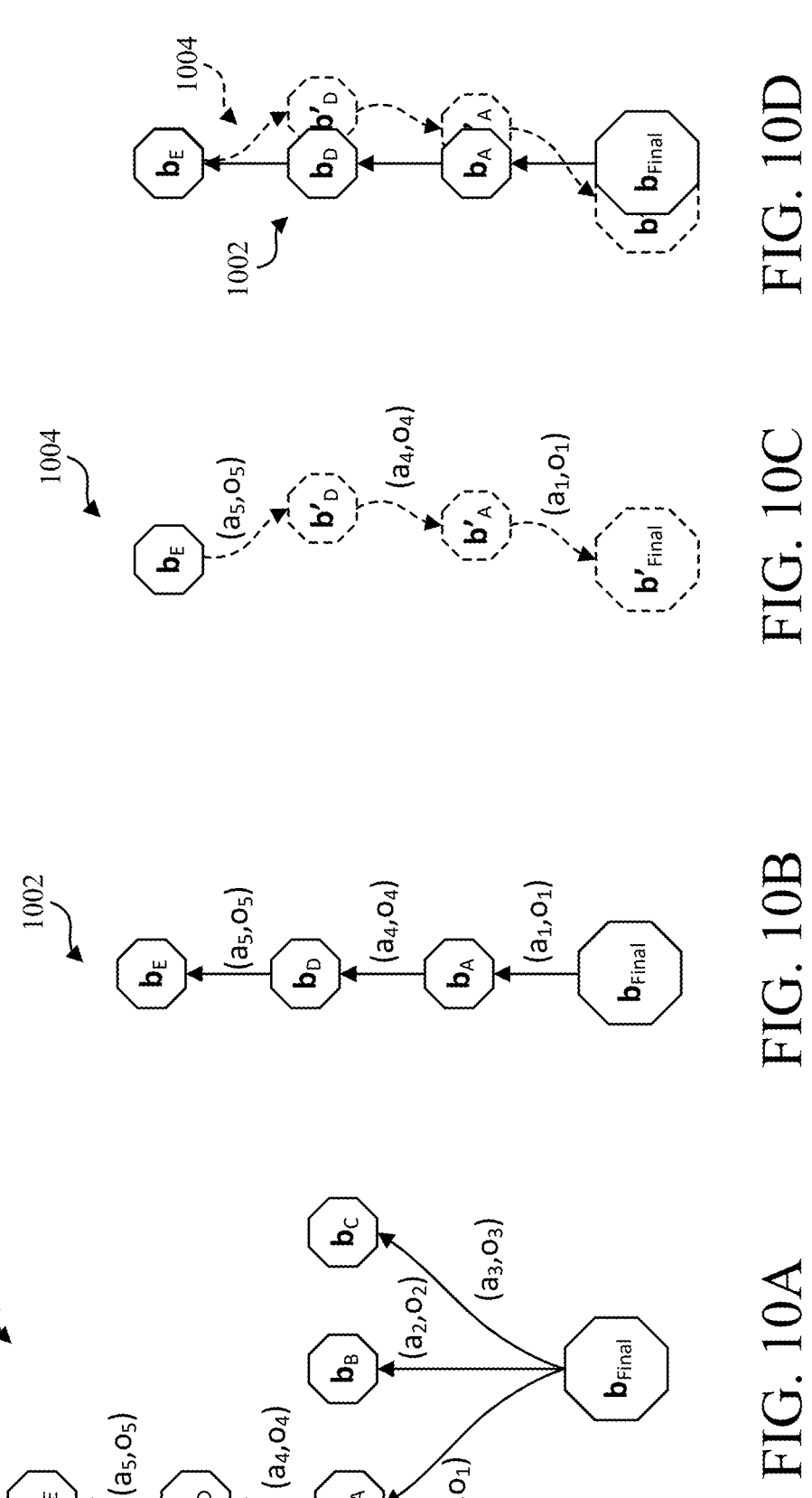
FIGS. 10A-10D are schematic diagrams depicting examples of expanding a probability computation across a sequence of belief updates.

FIGS. 10A-10C are schematic diagrams depicting examples 1000, 1002, and 1004, respectively, of expanding a probability computation across a sequence of belief updates. FIG. 10D is a diagram depicting the example 1002 of FIG. 10B superimposed on the example 1004 of FIG. 10C. The examples 1000, 1002, and 1004 may be implemented in an autonomous vehicle, such as the vehicle 100 shown in FIG. 1, one of the vehicles 210/211 shown in FIG. 2, a semi-autonomous vehicle, or any other vehicle implementing autonomous driving. For example, an autonomous vehicle may implement the examples 1000, 1002, and 1004 using an autonomous vehicle operational management system, such as the autonomous vehicle operational management system 300 shown in FIG. 3. In some implementations described herein, the examples 1000, 1002, and 1004 may be implemented in a remote assistance or support center, such as by a control center incorporating the communication device 240.

From a leaf belief node, multiple previous belief nodes can be computed or sampled. The early stages of backward tree construction are shown in FIG. 10A. The bottommost leaf node is the final belief $b_{final}$, and three belief nodes are sampled in the second to last layer with respect to the given (action, observation) pairs in the figure. The representation in FIG. 10A uses the same depiction for a backward tree construction as in FIG. 7, but the action and observation nodes are omitted for brevity. Each of these $b_A$, $b_B$, $b_C$ nodes can be further constructed backwards in time. As shown in FIG. 10B, the agent may constrain its focus on a specific 4-layer trajectory between $b_{final}$ and $b_E$. In this example path, the backward tree illustrates that there is a non-zero probability that, when started from $b_E$, if action $a_5$ is taken and observation $o_5$ is observed, the belief would be updated to bp (forward in time). Similarly, the pair $(a_4, o_4)$ from bp would lead to $b_A$. And finally, the pair $(a_1, o_1)$ from $b_A$ would lead to the final belief $b_{final}$. In other words, by following history h=($a_5$, $o_5$, $a_4$, $o_4$, $a_1$, $o_1$) when the initial belief is $b_E$, the final belief would be $b_{final}$, and the probability of this update happening is nonzero. The agent may use BayesianProb to compute this probability P($b_{final}$, $o_5$, $o_4$, $o_1$|$b_E$, $a_5$, $a_4$, $a_1$).

As shown in FIG. 10C, the agent may simulate the root node $b_E$ forward in time. First, the agent may calculate the probability P($b_D$, $o_5$|$b_E$, $a_5$) using the BranchWeight function. Then, the agent may deterministically update $b_E$ forward in time, using ($a_5$, $o_5$), where the resulting new belief is $$b'_D.$$

Here, beliefs $b_D$ and $$b'_D$$

may not be equivalent, depending on the objective value J after the linear program for that layer is solved. That being said, J will have a negligible value that is very close to zero.

This is because previous beliefs are found locally, such as by considering a single backward timestep. In a 3-layer branch in the tree, b"→b'→b, the generated or sampled b' from b might a large entropy (a spread belief), and therefore no action-observation pair from b" might make it attainable to exactly update to b'. This can be remedied by a more domain-specific belief sampling scheme. Accordingly, it can be assumed that P(b'|b, a, o)≈1, in this case $$P(b'_D \mid b_E, a_5, o_5) \approx 1,$$

in equation (51). In the case where J=0 occurs, then $$b'_D \equiv b_D,$$

which would then imply $$P(b'_D \mid b_E, a_5, o_5) = 1.$$

The belief update from $b_E$ to $$b'_D$$

is handled by UpdateBelief.

As shown in FIG. 10D and described in Algorithm 2 above, the agent may iteratively call the BranchWeight function over the new beliefs found by the UpdateBelief function. These Bayesian relations allow the agent to simulate a root node forward in time, given its history, up until the leaf node representing the final belief $b_{final}$:

$$
\begin{aligned}
P\big(b_{final}, o_5, o_4, o_1 \big| b_E, a_5, a_4, a_1\big) &= P\big(b_D, o_5 \big| b_E, a_5\big) P\big(b_A, o_4 \big| b_D, a_4\big) \\
&\quad P\big(b_{final}, o_1 \big| b'_A, a_1\big) \\
&\approx P\big(b'_D, o_5 \big| b_E, a_5\big) P\big(b'_A, o_4 \big| b'_D, a_4\big) \\
&\quad P\big(b_{final}, o_1 \big| b'_A, a_1\big)
\end{aligned}
\tag{52}
$$

The first relation above holds due to the Markovian property of the problem, which is that a belief update depends only on the most recent action-observation pair, as demonstrated in the proof below. The terminal Bayesian probability for a multi-layer history path is the product of the reachability probabilities of all edges in the path. Then, the terminal Bayesian probability of a 3-layer history h=($a_1$, $o_1$, $a_2$, $o_2$) for the tree path $$b \xrightarrow{a_1} b' \xrightarrow{a_2} b''$$

(root to leaf) may be computed. Then, the probability of reaching belief b" from b while following history h can be computed as follows:

$$P(b'', o_1, o_2 \mid b, a_1, a_2) = P(o_1 \mid b, a_1, a_2)P(b'', o_2 \mid b, a_1, a_2, o_1)$$

$$= P(o_1 \mid b, a_1, a_2)\sum_{b' \in B} P(b'', o_2 \mid \check{b}', b, a_1, a_2, o_1)$$

$$P(\check{b}' \mid b, a_1, a_2, o_1)$$

$$= P(o_1 \mid b, a_1)\sum_{b' \in B} P(b'', o_2 \mid \check{b}', a_2)P(\check{b}' \mid b, a_1, o_1)$$

$$= P(o_1 \mid b, a_1)P(b''o_2 \mid b', a_2)P(b' \mid b, a_1, o_1)$$

$$= P(b', o_1 \mid b, a_1)P(b'', o_2 \mid b', a_2)$$

(53)

where the summation over all possible next beliefs ($\check{b}' \in \mathcal{B}$) simplified to the case of just b'. This is because only b' can be achieved when belief b is updated with respect to $(a_1, o_1)$, e.g., belief updates are deterministic as $P(\check{b}'|b, a_1, o_1)=0$ for all $\check{b}' \in \mathcal{B}$, $\check{b}' \neq b'$. The expression in equation (53) can be generalized to a tree path of arbitrary layers.

As shown, the simulated forward trajectory slightly deviated from the approximated backward trajectory. However, due to the assumption $P(b'|b, a, o) \approx 1$ for every layer during belief updates, the deviation is negligibly small. As a result, the terminal Bayesian probability, found by BayesianProb, of $b_E$ for following its given history, is highly accurate.

In some implementations, construction of the backward Monte Carlo tree may begin with Algorithm 3, shown below. In addition to the POMDP formulation of the problem, the only input argument that needs to be passed is the final belief node (the single bottom-most leaf node) $b_{final}$ that the tree will start searching upwards from. The Search function uses two hyperparameters—the maximum number of timesteps $t_{max}$ that the agent desires the tree to search backward (also called a depth) and the number of simulations $m_{sims}$ desired for each timestep layer in the tree. The Search function starts by initializing an empty tree $\mathcal{T}$. Here, the tree $\mathcal{T}$ is a structure that has three fields—N(h), which counts the number of times an action-observation history h has been visited in the tree, Q(h), which records the estimated mean reachability probability for all histories that have the suffix h, and B, which is a set of (belief, history) pairs. At each layer of a timestep t, a leaf node is sampled to branch out the remaining timesteps $t_{max}-t$. The function SampleLeaf samples a (belief, history) pair from $\mathcal{T}$. B, which is the B field of the tree $\mathcal{T}$, as dot notation may be used to denote the fields N, Q, and B of the tree $\mathcal{T}$. For t=1, the only pair that SampleLeaf returns is ($b_{final}$, $\emptyset$). For each of the ($b_t$, h) pairs sampled, the tree is simulated through the Simulate function, defined in Algorithm 3, that modifies $\mathcal{T}$ in-place. Note that Algorithm 2 is an anytime algorithm and is parallelizable.

---

Algorithm 2

Params: $t_{max}$, $m_{sims}$
1:    function Search(b) $b_{final}$ )
2:        $\mathcal{T} = $ InITIALIZeTreE ( )
3:        for t = 1 to $t_{max}$ do
4:            for m = 1 to $m_{sims}$ do
5:                $b_t$, h ← SampleLeaf($\mathcal{T}$, t − 1)
6:                Simulate($\mathcal{T}$, $b_t$, h)
7:            end for
8:        end for
9:        return $\mathcal{T}$. B
10:   end function

---

In Algorithm 3, the agent simulates a branch for each starting leaf node, backward in time. The hyperparameters include $t_{max}$, as in Algorithm 2, $k_{ucb}$, the UCB1 exploration constant, and $k_{max}$, the z-value's exponential distribution constant. The Simulate function is similar to the original forward-search Monte Carlo planning algorithm. At every call, the Simulate function first appends the (belief, history) pair to the tree. Then, the history is checked whether it satisfies the maximum depth requirement, and if not, the tree continues branching backward in time. If a certain history has not been visited before, the branch rolls out through the Rollout function in Algorithm 4. Otherwise, an observation is sampled from the probability distribution P(o). Afterward, an action is sampled with respect to the UCB1 strategy. The function continues with the intent to construct a linear program (LP) to detect possible previous beliefs. To construct the LP, a z-value is required.

---

Algorithm 3

Params: $t_{max}$, $k_{ucb}$, $k_{z-exp}$

1: function Simulate($\mathcal{T}$, $b_t$, h)
2:    $\mathcal{T}$.B ← $\mathcal{T}$. B ∪ {($b_t$, h)} ▹ Append belief and its history to tree.

3:    if DEPTH(h) = $t_{max}$ then

4:        return BaYesianProB ($b_t$, h) ▹ Termination due to depth.

5:    end if

6:    if (·, h) ∉ $\mathcal{T}$. B then

7:        return RollouT ($b_t$, h) ▹ Rollout due to lack of history in existing tree.

8:    end if

9:    o ← SAMPLEOBS($b_t$)

10:   a ← UCB1($k_{ucb}$, h, o)
11: z ← SAMPLEINVERSELP($b_t$, a, o, $k_{z-exp}$) ▹ Sample exponentially from (0, $z_{max}$].
12: v ← ConstructAndSolveLP ($b_t$, z, a, o) ▹ Optimal vertices of the LP.
13: if v = ∅ then
14:     q ← 0 ▹ Discourage histories that are unable to reach depth of $t_{max}$.

-continued

| Algorithm 3 |
| --- |

15: else
16:     $b_{t-1}$ ← SAmpleBeliEF(v, a, o)

17:     q ← Simulate($\mathcal{T}$, $b_{t-1}$, aoh) ▷ Recursively simulate backwards.

18: end if
19: $\mathcal{T}$. N(oh) ← $\mathcal{T}$.N(oh) + 1
20: $\mathcal{T}$. N(aoh) ← $\mathcal{T}$. N(aoh) + 1

21: $\mathcal{T}.Q(aoh)$ ← $\mathcal{T}.Q(aoh) + \dfrac{q - \mathcal{T}.Q(aoh)}{\mathcal{T}.N(aoh)}$ 22: return q
23: end function The maximum possible value of z, denoted $z_{max}$, can be solved for use in the inverse of the original linear program. The value of $z_{max}$ is unique for each ($b_t$, a, o) triplet. Once history thus far, is returned. The terminal Bayesian probability value is computed by BAYESIANProb. Finally, the N and Q fields of $\mathcal{T}$ are updated accordingly.

| Algorithm 4 |
| --- |

Params: $t_{max}$, $k_{z-exp}$
1:  function Rollout($\mathcal{T}$, $b_t$, h)
2:     $\mathcal{T}$.B ← $\mathcal{T}$. B ∪ {($b_t$, h)}▷ Append belief and its history to tree.
3:     if DePtH(h) = $t_{max}$ then
4:         return BAYESIANProb ($b_t$, h)▷ Termination due to depth.
5:     end if
6:     o ← SAMPLEOBS($b_t$)
7:     a ← $\pi_{rollout}$ (h)
8:     z ← SAMPLEINVERSELP($b_t$, a, o, $k_{z-exp}$ )▷ Sample exponentially from (0, $z_{max}$].
9:     v ← Construct AndSolveLP ($b_t$, z, a, o)▷ Optimal vertices of the LP.
10:        if v = ∅ then
11:            return 0▷ Discourage histories that are unable to reach depth of $t_{max}$.
12:        else
13:                $b_{t-1}$ ← SampleBelieF(v, a, o)
14:                return Rollout ($\mathcal{T}$, $b_{t-1}$, aoh )▷ Recursively rollout backwards.
15:        end if
16:     end function $z_{max}$ is known, a z-value can be sampled from the exponential distribution, parametrized by $k_{z-exp}$, from an interval between 0 and $z_{max}$. Both operations, namely computing $z_{max}$ and sampling the z-value, which are given by equations (36) and (42) respectively, are handled by SampleInverselp. Once the z-value is obtained, the LP can be formulated.

Because the agent is interested not only in one optimal solution but rather the vertices spanning the optimal solution polygon, the agent may transform the original linear program into its equality form. In Algorithm 3, the function ConstructAndSolveLP handles these operations. In particular, the function ConstructAndSolveLP constructs the linear program with respect to action a and observation o, whose belief reachability is parametrized by z, and then transforms it into its equality form. Then, using the equality form, the optimal vertices can be extracted by pivoting. The function ConstructAndSolveLP returns the set of optimal vertices v. If there are no vertices (i.e., v is an empty set), then the agent may set the local Q-value, denoted as q, to be zero for history h. Otherwise, the agent may sample a belief from the optimal polygon of the LP using the vertices v. The function SampleBelief returns a feasible previous belief $b_{t-1}$. The tree can further branch backward by recursively calling the Simulate function, now with the previous belief $b_{t-1}$ with its history aoh. Once the tree reaches the desired depth, the terminal Bayesian probability of the root belief, by following its Algorithm 4 explains how Rollout works, which is similar to the way Simulate operates. Rollout starts by appending the (belief, history) pair to the tree, and then the depth requirement is checked. If the desired depth is reached, then the Rollout terminates by returning the terminal Bayesian probability value. Otherwise, similar to the Simulate function, an observation is sampled. However, unlike the Simulate function, the Rollout function uses a rollout policy $\pi_{rollout}$ to select the action. Although the policy can include domain knowledge, a random policy is discussed herein. Then, a z-value is sampled after solving the inverse linear program, and the set of optimal vertices v are computed. If this set is empty, then the Rollout function returns zero, otherwise, a previous belief is sampled, and the Rollout function is called recursively.

In various implementations, the backward Monte Carlo tree may be generalized for any belief. A belief node's probability of reaching the final leaf node may be referred to as the terminal Bayesian probability of a belief. Determining the terminal Bayesian probability of a belief may be achieved using a process that can be summarized as tracing the belief node's path in the tree and recursively computing and multiplying p(b', o|b, a) after applying Bayesian belief updates. The process contemplates that the histories were explicitly realized within the tree for a given belief node. In some examples, the approximation can be extended to determine the terminal Bayesian probability for any belief in the belief space B. By doing so, an agent may generalize the identification of unsafe beliefs to the entire belief space of the problem. The law of large numbers suggests that if there are enough samples, the entire belief space $\mathcal{B}$ will be adequately represented. The BMCTS approach described herein assumes that by increasing the number of distinct branches in the backward tree, an agent can effectively cover the part of the belief space that is of importance. Once there are sufficient belief nodes in the backward tree $\mathcal{T}$, the agent can make the following assumption:

$$\pi * \left(\tilde{b} \,\middle|\, o_1, o_2, \ldots \right) = \pi * (b \,|\, o_1, o_2, \ldots ) \tag{54}$$

$$= \{a_1, a_2, \ldots \} \forall \, \tilde{b} \notin \mathcal{T}$$

$$\text{s.t. } b = \underset{b|(b,h)\in\mathcal{T}.B}{\arg\min}\, dist\!\left(b, \tilde{b}\right) \text{ where } h = \{a_1, o_1, a_2, o_2, \ldots \}.$$

In other words, for any belief $\tilde{b}$ that is not a node in $\mathcal{T}$, the sequence of actions that is closest to the optimal will be the same as those of the belief $b \in \mathcal{B}$ having smallest distance to $\tilde{b}$, given that the same observations are received. Here, the term "distance" is used loosely, and can incorporate domain knowledge, where a smaller distance signifies greater similarity between two beliefs. The L2 norm may be used to compute the distance between two beliefs as follows:

$$dist\!\left(b, \tilde{b}\right) \triangleq \left\| b - \tilde{b} \right\|_2. \tag{55}$$

By making the assumption in equation (54), the agent is partitioning the entire belief space with each cell denoting a specific history of actions and observations. These belief nodes become the seeds of a cell, creating a Voronoi diagram from the entire belief space. Thus, every other belief falls into the Voronoi cell with the shortest distance from its seed. Per the assumption in equation (54), it can be assumed that every belief in each Voronoi cell follows the same history that will lead to the leaf representing the final belief $b_{final}$ of the tree $\mathcal{T}$. The discrepancy from the actual action sequence followed may be negligible (e.g., equation (54) is a valid assumption) when there is a sufficient number of beliefs to effectively cover the entire belief space. Additionally, the terminal Bayesian probability found for a belief node in the tree $\mathcal{T}$ may be found to be a strict lower bound to the true probability of reaching the final bound with observations different from the recorded histories.

As indicated above, the terminal Bayesian probabilities of a belief node are a lower bound to the probability of reaching the final belief while any observation can be observed. For example, in a case involving 2-layer paths, this can be represented by:

$$P(b' \,|\, b, a) = \sum_{o \in O} P(b' \,|\, b, a, o)P(o \,|\, b, a) \geq \tag{56}$$

$$P(b' \,|\, b, a, o)P(o \,|\, b, a) \forall \, o \in O \geq P(b', o \,|\, b, a) \forall \, o \in O.$$

The relation in equation (56) indicates that the terminal Bayesian probability that is computed for an initial (root) belief and its history is a lower bound for any observations that may be received along the way; as long as the policy (and actions taken along the path) does not change. To generalize for multiple layers, a case for a 3-layer tree path $$b \xrightarrow{a_1} b' \xrightarrow{a_2} b''$$

(root to leaf) can be considered. The probability of reaching belief b" from b while taking actions $(a_1, a_2)$ has the following lower bound (irrespective of the observations received) as follows:

$$P(b'' \,|\, b, a_1, a_2) = \sum_{b' \in \mathcal{B}} P(b'' \,|\, \tilde{b}', b, a_1, a_2)P(\tilde{b}' \,|\, b, a_1, a_2) = \tag{57}$$

$$\sum_{b' \in \mathcal{B}} P(b'' \,|\, \tilde{b}', a_2)P(\tilde{b}' \,|\, b, a_1) \geq P(b'' \,|\, b', a_2)P(b' \,|\, b, a_1) \geq$$

$$\left(\sum_{o \in O} P(b'' \,|\, b', a_2, o)P(o \,|\, b', a_2)\right)\!\!\left(\sum_{o \in O} P(b' \,|\, b, a_1, o)P(o \,|\, b, a_1)\right) \geq$$

$$P(b'' \,|\, b', a_2, o_2)P(o_2 \,|\, b', a_2)P(b' \,|\, b, a_1, o_1)P(o_1 \,|\, b', a_1) \forall \, o_1,$$

$$o_2 \in O \geq P(b'', o_2 \,|\, b', a_2)P(b', o_1 \,|\, b, a_1) \forall \, o_1,$$

$$o_2 \in O \geq P_{BMCTS}(b'', o_1, o_2 \,|\, b, a_1, a_2) \forall \, o_1, o_2 \in O.$$

where the final expression $P_{BMCTS}(b", o_1, o_2|b, a_1, a_2)$ is the expression given in equations (52) and (53). Therefore, the probability values that the agent computes through BMCTS with respect to the visited observations in the tree are a strict lower bound to any other observations that could have been received when the agent's policy is followed.

Thus, it follows that the terminal Bayesian probabilities found for belief nodes in the tree $\mathcal{T}$ are strict lower bounds if observations different from the recorded histories had been received. Furthermore, the agent can combine the Voronoi approximation method with the lower bound to account for any belief in the belief space. In this way, the agent may perform a method to approximate the lower bound for any belief's probability of reaching the undesired belief $b_{final}$ during real-time monitoring. In some implementations, this approximation may be accurate when there is a sufficient number of beliefs in the tree $\mathcal{T}$ to representatively span $\mathcal{B}$, yielding a strict lower bound in real-time.

Figures 11A, 11B:
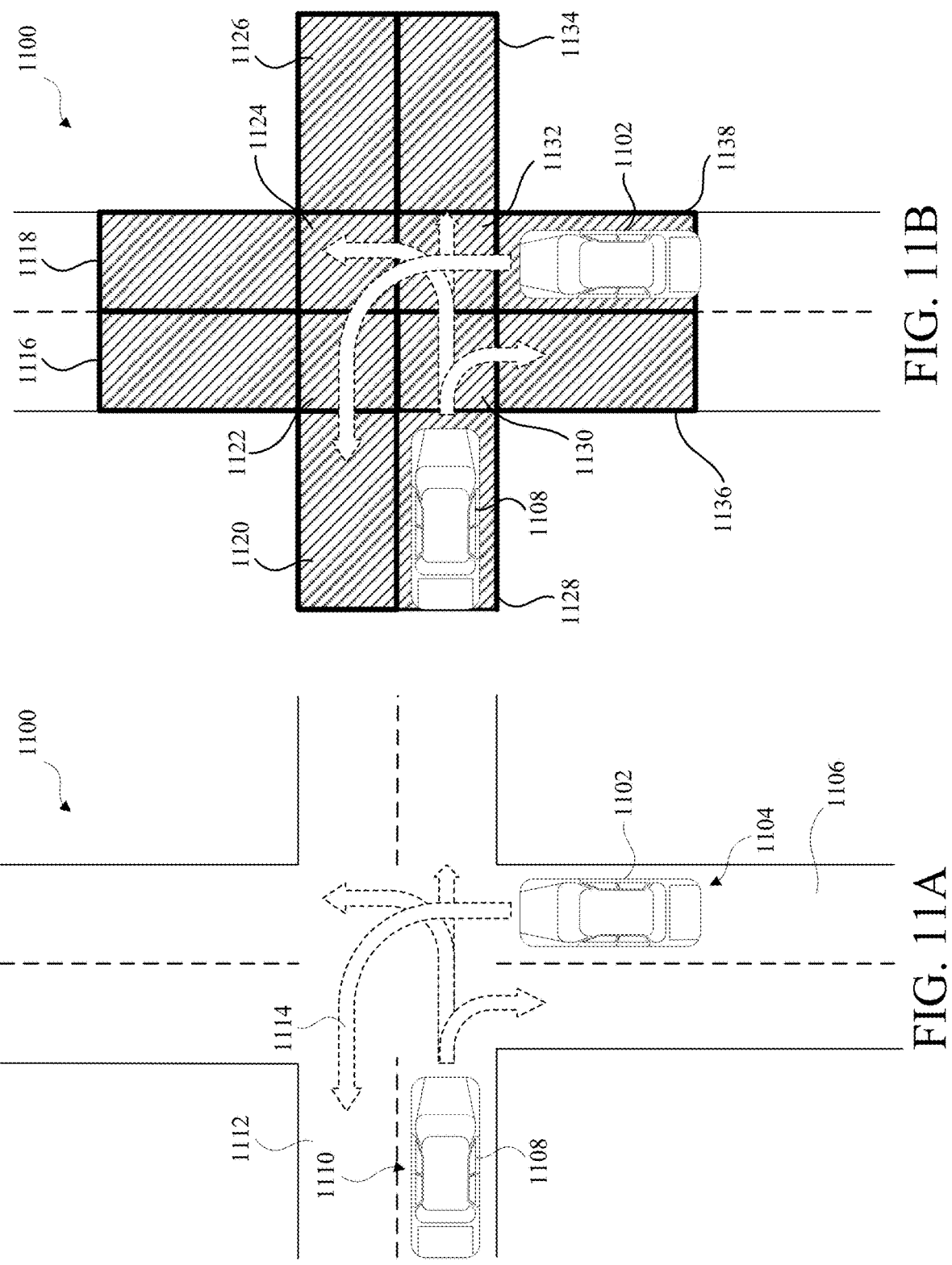
FIGS. 11A and 11B are diagrams of an example of an intersection scene where an autonomous vehicle action is based on a policy trained in association with initial beliefs determined using a BMCTS.

FIGS. 11A and 11B are diagrams of an example of an intersection scene 1100 where an autonomous vehicle action is based on a policy trained in association with initial beliefs determined using a BMCTS as described above in connection with FIGS. 6-10. Aspects of operations described below in connection with the intersection scene 1100 may be implemented in an autonomous vehicle, such as the vehicle 100 shown in FIG. 1, one of the vehicles 210/211 shown in FIG. 2, a semi-autonomous vehicle, or any other vehicle implementing autonomous driving. For example, an autonomous vehicle may implement the aspects of the operations described below in connection with the intersection scene 1100 using an autonomous vehicle operational management system, such as the autonomous vehicle operational management system 300 shown in FIG. 3. In some implementations, the operations described below in connection with the intersection scene 1100 may be implemented in a remote assistance or support center, such as by a control center incorporating the communication device 240.

In this example, an ego vehicle 1102 is approaching the intersection at a first position 1104 on a first road 1106 and another road user, in this example the vehicle 1108, is approaching the intersection at a second position 1110 on an adjacent road 1112. The ego vehicle 1102 may have determined to make a left turn, indicated by the arrow 1114, at the intersection, onto the adjacent road 1112. The ego vehicle 1102 may operate an instance of a scenario-specific operational control evaluation model that predicts the behavior of the other vehicle 1108 in the future up to a defined future time to select vehicle control actions for the ego vehicle 1102. For example, to mitigate the risk of a collision with the other vehicle 1108, the ego vehicle 1102 may infer the intention of the other vehicle 1108 and the associated risk of crashing.

The scenario depicted in FIG. 11A may be framed as a POMDP. The agent may model each ego vehicle-other road user interaction as an individual POMDP instantiation, which can then be centralized that takes the safest action across all instantiations. As shown in FIG. 11B, the ego vehicle 1102 may discretize the possible locations that the ego vehicle 1102 and the other vehicle 1108 can be into boxes 1116, 1118, 1120, 1122, 1124, 1126, 1128, 1130, 1132, 1134, 1136, and 1138 from a top-down view perspective. In the illustrated example, a total of 12 boxes from the viewpoint of the ego vehicle 1102 may be denoted. The ego vehicle 1102 also may consider the speed at which the other vehicle 1108 is moving within a box 1128, discretized to be one of the following values: {slow, moderate, fast}. These speed definitions may be based on expert knowledge to categorize actual continuous values into these three groups. The intention of the other vehicle 1108 can also be discretized to be one of the following values (with respect to the ego vehicle 1102): {left, right, straight}. Thus, the state space of the POMDP consists of the follow features: the box location of the ego vehicle 1102 and the other vehicle 1108, the velocity range of the other vehicle 1108, and the intention of the other vehicle 1108.

The ego vehicle 1102 may simulate the scenario with a frequency of 10 Hz. At each timestep instance, the POMDP is only concerned with the longitudinal control and has three actions that it can take: {accelerate, coast, brake}. The ego vehicle 1102 receives noisy observations over the features of the true state of the other vehicle 1108. As an example, the ego vehicle 1102 may simulate a number of scenarios (e.g., 100,000 scenarios) using a lightweight autonomous driving simulator to form an empirical likelihood over the transition and observation functions of the POMDP. The deployment of a POMDP framed in this manner has been shown to work well in real-world intersection crossing scenarios. The ego vehicle 1102 may create the BMCTS tree with a number of nodes. In one example, the ego vehicle 1102 may create the BMCTS tree with 5,261 nodes based on a final undesirable belief such as, for example, a case in which both the ego vehicle 1102 and the other vehicle 1108 end up in the box 1132 simultaneously, thereby resulting in a collision between the ego vehicle 1102 and the other vehicle 1108.

The BMCTS tree may be branched out from multiple leaf nodes where the ego vehicle 1102 samples states that correspond to different speeding values and ground-truth intentions of the other vehicle 1108. In an example, the ego vehicle 1102 may branch out 20 timesteps backward in time. Because the scenario is simulated to a frequency of 10 Hz, this allows the ego vehicle 1102 to look back at beliefs 2.0 seconds before a collision. The results of an example of the simulation described above are presented in Table 2, below.

TABLE 2

| | Time (s) | Num. of Nodes | Reachability Statistics (lower is better) | | | |
| | | | Minimum | Median | Mean | Maximum |
| --- | --- | --- | --- | --- | --- | --- |
| Initial | 0.1 | 49 | 34.53% | 60.26% | 61.62% | 77.01% |
| Policy | 0.2 | 71 | 27.92% | 40.27% | 41.81% | 50.66% |
| | 0.3 | 94 | 22.18% | 29.79% | 31.06% | 35.62% |
| | 0.4 | 116 | 19.67% | 23.31% | 23.34% | 26.58% |
| | 0.5 | 139 | 16.84% | 20.39% | 19.83% | 21.28% |
| | 0.6 | 161 | 15.30% | 17.15% | 18.15% | 19.57% |
| | 0.7 | 184 | 12.86% | 16.73% | 16.19% | 15.91% |
| | 0.8 | 207 | 12.50% | 14.20% | 15.25% | 14.34% |
| | 0.9 | 229 | 11.06% | 13.09% | 13.81% | 13.06% |
| | 1.0 | 252 | 9.84% | 12.62% | 12.57% | 11.95% |
| | 1.1 | 274 | 8.86% | 11.25% | 10.79% | 11.43% |
| | 1.2 | 297 | 7.61% | 10.61% | 9.93% | 10.43% |
| | 1.3 | 319 | 6.96% | 9.41% | 9.13% | 9.10% |
| | 1.4 | 343 | 6.20% | 8.54% | 8.98% | 9.09% |
| | 1.5 | 365 | 5.52% | 7.67% | 8.36% | 8.20% |
| | 1.6 | 387 | 4.82% | 7.49% | 7.50% | 7.54% |
| | 1.7 | 410 | 4.30% | 6.72% | 6.53% | 6.49% |
| | 1.8 | 432 | 3.92% | 6.19% | 6.35% | 6.43% |
| | 1.9 | 455 | 3.43% | 5.77% | 5.50% | 5.95% |
| | 2.0 | 477 | 3.24% | 5.03% | 5.06% | 5.49% |
| Trained | 0.1 | 49 | 9.82% | 35.03% | 34.53% | 52.33% |
| Policy | 0.2 | 71 | 3.69% | 14.79% | 16.69% | 25.46% |
| | 0.3 | 94 | 1.46% | 6.75% | 7.81% | 12.90% |
| | 0.4 | 116 | 0.60% | 3.02% | 3.48% | 6.42% |
| | 0.5 | 139 | 0.23% | 1.41% | 1.55% | 3.07% |
| | 0.6 | 161 | 0.09% | 0.64% | 0.73% | 1.59% |
| | 0.7 | 184 | 0.04% | 0.28% | 0.33% | 0.76% |
| | 0.8 | 207 | 0.01% | 0.13% | 0.15% | 0.38% |
| | 0.9 | 229 | $5 \times 10^{-3}$% | 0.06% | 0.07% | 0.19% |
| | 1.0 | 252 | $3 \times 10^{-3}$% | 0.02% | 0.03% | 0.09% |
| | 1.1 | 274 | $8 \times 10^{-4}$% | 0.01% | 0.02% | 0.05% |
| | 1.2 | 297 | $3 \times 10^{-4}$% | $5 \times 10^{-3}$% | 0.01% | 0.02% |
| | 1.3 | 319 | $1 \times 10^{-4}$% | $3 \times 10^{-3}$% | $3 \times 10^{-3}$% | 0.01% |
| | 1.4 | 343 | $5 \times 10^{-5}$% | $9 \times 10^{-4}$% | $2 \times 10^{-3}$% | 0.01% |
| | 1.5 | 365 | $1 \times 10^{-5}$% | $4 \times 10^{-4}$% | $7 \times 10^{-4}$% | $3 \times 10^{-3}$% |
| | 1.6 | 387 | $7 \times 10^{-6}$% | $2 \times 10^{-4}$% | $3 \times 10^{-4}$% | $1 \times 10^{-3}$% |
| | 1.7 | 410 | $2 \times 10^{-6}$% | $9 \times 10^{-5}$% | $1 \times 10^{-4}$% | $6 \times 10^{-4}$% |
| | 1.8 | 432 | $1 \times 10^{-6}$% | $4 \times 10^{-5}$% | $6 \times 10^{-5}$% | $3 \times 10^{-4}$% |

TABLE 2-continued

| Time (s) | Num. of Nodes | Reachability Statistics (lower is better) | | | |
|---|---|---|---|---|---|
| | | Minimum | Median | Mean | Maximum |
| 1.9 | 455 | $4 \times 10^{-7}$% | $1 \times 10^{-5}$% | $3 \times 10^{-5}$% | $1 \times 10^{-4}$% |
| 2.0 | 477 | $1 \times 10^{-7}$% | $8 \times 10^{-6}$% | $1 \times 10^{-5}$% | $8 \times 10^{-5}$% |

Table 2 indicates the minimum, median, mean, and maximum reachability probabilities of the belief nodes in the tree, for different times (in seconds) backward prior to a collision. The upper half of Table 2 shows the statistics for the tree built when the ego vehicle 1102 has an initial policy that has been trained before the tree is generated. As suggested by the results presented in Table 2, by retraining the ego vehicle's policy on the beliefs that have been identified through the backward tree, the ego vehicle 1102 may be able to significantly enhance the performance of the self-driving car by greatly reducing the collision (reachability) probabilities into the future.

Figure 12:
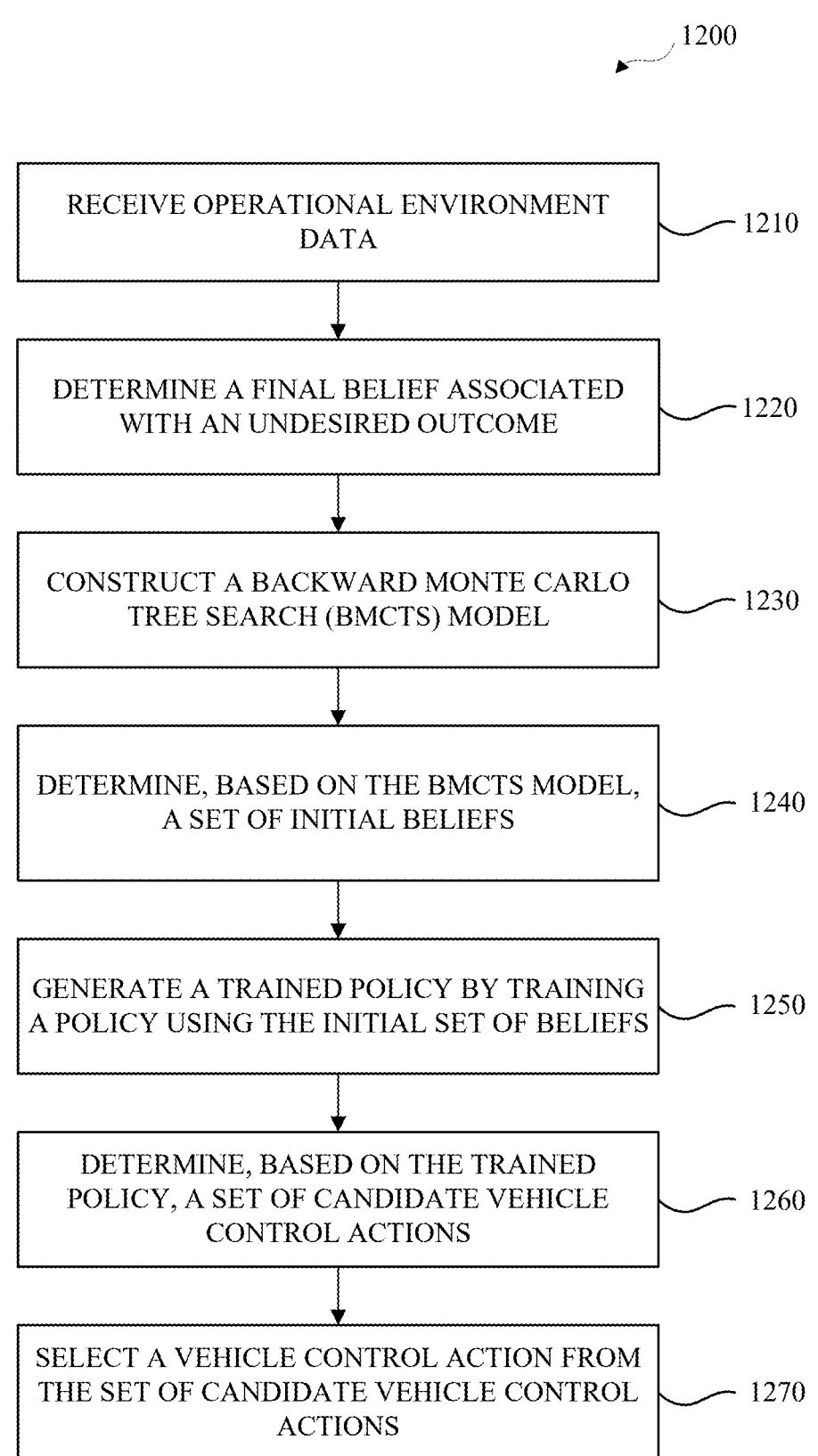
FIG. 12 is a flow diagram of an example of a method for use with a vehicle in traversing a vehicle transportation network.

FIG. 12 is a flow diagram of an example method 1200 for use with a vehicle in traversing a vehicle transportation network, in accordance with the present disclosure. The method 1200 may be implemented in an autonomous vehicle, such as the vehicle 100 shown in FIG. 1, one of the vehicles 210/211 shown in FIG. 2, a semi-autonomous vehicle, or any other vehicle implementing autonomous driving. For example, an autonomous vehicle may implement the method 1200 using an autonomous vehicle operational management system, such as the autonomous vehicle operational management system 300 shown in FIG. 3. In some implementations described herein, the method 1200 may be implemented in a remote assistance or support center, such as by a control center incorporating the communication device 240.

The method 1200 includes, at operation 1210, receiving operational environment data. The operational environment data may be received while the vehicle is traversing a vehicle transportation network. The operational environment data may include data associated with an object external to the vehicle. The object may be an additional vehicle. The method 1200 further includes, at operation 1220, determining a final belief associated with an undesired outcome. The final belief may be determined based at least in part on the data associated with the object.

The method 1200 further includes, at operation 1230, constructing a backward Monte Carlo tree search (BMCTS) model. The BMCTS model may be constructed based on the final belief. Constructing the BMCTS model may include constructing the BMCTS model based on a maximum depth value. The method 1200 further includes, at operation 1240, determining, based on the BMCTS model, a set of initial beliefs corresponding to a likelihood of leading to the final belief within a timestep threshold. In some implementations, determining the set of initial beliefs may include sampling the set of initial beliefs from a subspace of a belief space. Sampling the set of initial beliefs may include approximating a terminal Bayesian probability of an initial belief of the set of initial beliefs. Determining the set of initial beliefs may include partitioning a belief space based on an association between a set of actions and a corresponding set of observations. The subspace may correspond to a face of a computed convex polygon. An initial belief of the set of initial beliefs may correspond to a path from the initial belief to the final belief within the timestep threshold via a sequence of actions and observations.

In some implementations, determining the set of initial beliefs may include establishing a first node corresponding to the final belief, where first node is associated with a first time, sampling, based on the first node, a set of possible observations associated with a second time occurring one timestep prior to the first time, sampling, based on the first node, a set of possible actions associated with a third time occurring one timestep prior to the second time, where the set of possible actions correspond to a likelihood of leading to the set of possible observations, and sampling, based on the set of possible actions, the set of initial beliefs. Sampling the set of initial beliefs may include sampling the set of initial beliefs from a convex polytope. The method 1200 may further include constraining the convex polytope based on a reachability probability threshold.

The method 1200 further includes, at operation 1250, generating a trained policy by training a policy using the set of initial beliefs. The policy may map a respective belief for the object within the distinct vehicle operation scenario to a respective candidate vehicle control action. The method 1200 further includes, at operation 1260, determining, based on the trained policy, a set of candidate vehicle control actions. The set of candidate vehicle control actions may include a set of alternative actions associated with an intersection approached by the vehicle and the additional vehicle. The set of initial beliefs may be represented as a partially observable Markov decision process. The method 1200 further includes, at operation 1270, selecting, for traversing the vehicle transportation network, a vehicle control action from the set of candidate vehicle control actions.

Although described herein with reference to an autonomous vehicle, the methods and apparatus described herein may be implemented with any vehicle capable of autonomous or semi-autonomous operation. Although described with reference to a vehicle transportation network, the method and apparatus described herein may include the autonomous vehicle operating in any area navigable by the vehicle.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some embodiments, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A method for use with a vehicle in traversing a vehicle transportation network, the method comprising:
   receiving, by an autonomous vehicle operational management controller (AVOMC) implemented on the vehicle, while the vehicle is traversing the vehicle transportation network, operational environment data, wherein the operational environment data includes data associated with an object external to the vehicle;
   determining, by the AVOMC and based at least in part on the data associated with the object, a final belief associated with an undesired outcome;
   constructing, by the AVOMC, a backward Monte Carlo tree search model based on the final belief;
   determining, by the AVOMC and based on the backward Monte Carlo tree search model, a set of initial beliefs corresponding to a likelihood of leading to the final belief within a timestep threshold;
   generating, by the AVOMC, a trained policy by training, using the set of initial beliefs, a policy that maps a respective belief for the object within a distinct vehicle operation scenario to a respective candidate vehicle control action;
   determining, by the AVOMC and based on the trained policy, a set of candidate vehicle control actions; and
   controlling, by the AVOMC, the vehicle to traverse the vehicle transportation network based on selecting a vehicle control action from the set of candidate vehicle control actions.

2. The method of claim 1, wherein determining the set of initial beliefs comprises sampling the set of initial beliefs from a subspace of a belief space.

3. The method of claim 2, wherein the subspace corresponds to a face of a computed convex polygon.

4. The method of claim 1, wherein an initial belief of the set of initial beliefs corresponds to a path from the initial belief to the final belief within the timestep threshold via a sequence of actions and observations.

5. The method of claim 1, wherein the object is an additional vehicle.

6. The method of claim 5, wherein the set of candidate vehicle control actions comprises a set of alternative actions associated with an intersection approached by the vehicle and the additional vehicle.

7. The method of claim 5, wherein the set of initial beliefs is represented as a partially observable Markov decision process.

8. The method of claim 1, wherein determining the set of initial beliefs comprises:
   establishing a first node corresponding to the final belief, wherein the first node is associated with a first time;
   sampling, based on the first node, a set of possible observations associated with a second time occurring one timestep prior to the first time;
   sampling, based on the first node, a set of possible actions associated with a third time occurring one timestep prior to the second time, wherein the set of possible actions correspond to a likelihood of leading to the set of possible observations; and
   sampling, based on the set of possible actions, the set of initial beliefs.

9. The method of claim 8, wherein sampling the set of initial beliefs comprises sampling the set of initial beliefs from a convex polytope, the method further comprising constraining the convex polytope based on a reachability probability threshold.

10. The method of claim 1, wherein constructing the backward Monte Carlo tree search model comprises constructing the backward Monte Carlo tree search model based on a maximum depth value.

11. The method of claim 1, determining the set of initial beliefs comprises approximating a terminal Bayesian probability of an initial belief of the set of initial beliefs.

12. The method of claim 1, determining the set of initial beliefs comprises partitioning a belief space based on an association between a set of actions and a corresponding set of observations.

13. An apparatus for use with a vehicle traversing a vehicle transportation network, the apparatus comprising:
a processor configured to:
receive, by an autonomous vehicle operational management controller (AVOMC) implemented on the vehicle, while the vehicle is traversing the vehicle transportation network, operational environment data, wherein the operational environment data includes data associated with an object external to the vehicle;
determine, by the AVOMC and based at least in part on the data associated with the object, a final belief associated with an undesired outcome;
determine, by the AVOMC and based on a backward Monte Carlo tree search model constructed based on the final belief, a set of initial beliefs corresponding to a likelihood of leading to the final belief within a timestep threshold;
generate, by the AVOMC, a trained policy by training, using the set of initial beliefs, a policy that maps a respective belief for the object within a distinct vehicle operation scenario to a respective candidate vehicle control action;
determine, by the AVOMC and based on the trained policy, a set of candidate vehicle control actions; and
control, by the AVOMC, the vehicle to traverse the vehicle transportation network based on selecting a vehicle control action from the set of candidate vehicle control actions.

14. The apparatus of claim 13, wherein the set of initial beliefs is sampled from a subspace of a belief space, and wherein the subspace corresponds to a face of a computed convex polygon.

15. The apparatus of claim 13, wherein an initial belief of the set of initial beliefs corresponds to a path from the initial belief to the final belief within the timestep threshold via a sequence of actions and observations.

16. The apparatus of claim 13, wherein the object is an additional vehicle.

17. The apparatus of claim 16, wherein the set of candidate vehicle control actions comprises a set of alternative actions associated with an intersection approached by the vehicle and the additional vehicle.

18. The apparatus of claim 13, wherein the processor, to determine the set of initial beliefs, is configured to:
establish a first node corresponding to the final belief, wherein the first node is associated with a first time;
sample, based on the first node, a set of possible observations associated with a second time occurring one timestep prior to the first time;
sample, based on the first node, a set of possible actions associated with a third time occurring one timestep prior to the second time, wherein the set of possible actions correspond to a likelihood of leading to the set of possible observations; and
sample, based on the set of possible actions, the set of initial beliefs.

19. An autonomous vehicle, comprising:
a processor configured to execute instructions stored on a non-transitory computer readable medium to:
receive, by an autonomous vehicle operational management controller (AVOMC) implemented on the vehicle, while the vehicle is traversing a vehicle transportation network, operational environment data, wherein the operational environment data includes data associated with an object external to the vehicle;
determine, by the AVOMC and based at least in part on the data associated with the object, a final belief associated with an undesired outcome;
determine, by the AVOMC and based on a backward Monte Carlo tree search model constructed based on the final belief, a set of initial beliefs corresponding to a likelihood of leading to the final belief within a timestep threshold;
determine, by the AVOMC and based on a trained policy, a set of candidate vehicle control actions, wherein the trained policy comprises a policy, trained using the set of initial beliefs, that maps a respective belief for the object within a distinct vehicle operation scenario to a respective candidate vehicle control action; and
control, by the AVOMC, the vehicle to traverse the vehicle transportation network based on selecting a vehicle control action from the set of candidate vehicle control actions.

20. The autonomous vehicle of claim 19, wherein an initial belief of the set of initial beliefs corresponds to a path from the initial belief to the final belief within the timestep threshold via a sequence of actions and observations.

* * * * *